United States Patent
Shinkai et al.

(10) Patent No.: US 8,082,366 B2
(45) Date of Patent: Dec. 20, 2011

(54) TRANSMITTER-RECEIVER SYSTEM, INFORMATION PROCESSING APPARATUS, INFORMATION PROCESSING METHOD AND PROGRAM

(75) Inventors: Mitsutoshi Shinkai, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1123 days.

(21) Appl. No.: 11/561,219

(22) Filed: Nov. 17, 2006

(65) Prior Publication Data

US 2008/0013914 A1 Jan. 17, 2008

(30) Foreign Application Priority Data

Nov. 29, 2005 (JP) ................................. 2005-343191

(51) Int. Cl.
*G06F 15/16* (2006.01)
*G11B 27/00* (2006.01)
(52) U.S. Cl. .................. 709/246; 709/203; 386/281
(58) Field of Classification Search .................. None
See application file for complete search history.

(56) References Cited

U.S. PATENT DOCUMENTS

| | | | | |
|---|---|---|---|---|
| 6,005,678 | A * | 12/1999 | Higashida et al. | 358/452 |
| 6,016,380 | A * | 1/2000 | Norton | 386/281 |
| 6,351,765 | B1 * | 2/2002 | Pietropaolo et al. | 709/218 |
| 6,876,382 | B1 * | 4/2005 | Sakamoto | 348/207.99 |
| 7,319,536 | B1 * | 1/2008 | Wilkins et al. | 358/1.15 |
| 7,424,202 | B2 * | 9/2008 | Nakamura et al. | 386/278 |
| 7,512,423 | B2 * | 3/2009 | Karaoguz | 455/574 |
| 7,769,270 | B2 * | 8/2010 | Nakamura et al. | 386/280 |
| 7,865,833 | B2 * | 1/2011 | Takaku et al. | 715/723 |
| 2001/0004417 | A1 * | 6/2001 | Narutoshi et al. | 386/52 |
| 2002/0065800 | A1 * | 5/2002 | Morlitz | 707/1 |
| 2004/0057704 | A1 * | 3/2004 | Katsuo et al. | 386/125 |
| 2004/0073936 | A1 * | 4/2004 | Kurauchi | 725/90 |
| 2004/0179102 | A1 * | 9/2004 | Matsufune | 348/207.1 |
| 2005/0168580 | A1 * | 8/2005 | Fukushima et al. | 348/207.99 |
| 2005/0237391 | A1 * | 10/2005 | Shibuya et al. | 348/207.1 |
| 2008/0201576 | A1 * | 8/2008 | Kitagawa et al. | 713/168 |

FOREIGN PATENT DOCUMENTS

| | | |
|---|---|---|
| JP | 11-136631 | 5/1999 |
| JP | 2001-290731 | 10/2001 |
| JP | 2003-150494 | 5/2003 |
| JP | 2004-289718 | 10/2004 |

OTHER PUBLICATIONS

U.S. Appl. No. 11/558,218, filed Nov. 9, 2006, Shinkai, et al.
U.S. Appl. No. 11/559,088, filed Nov. 13, 2006, Shinkai, et al.
U.S. Appl. No. 11/560,636, filed Nov. 16, 2006, Shinkai.

* cited by examiner

*Primary Examiner* — Patrice Winder
(74) *Attorney, Agent, or Firm* — Oblon, Spivak, McClelland, Maier & Neustadt, L.L.P.

(57) ABSTRACT

A transmitter-receiver system, an information processing apparatus an information processing method and a program are provided. A transmitter-receiver system includes: a transmitting apparatus configured to transmit an edited result obtained by editing data in a plurality of files; and a receiving apparatus configured to receive the edited result from the transmitting apparatus, wherein the transmitting apparatus includes: a storage unit configured to store the files and editing information about the edited result; an acquiring unit configured to acquire the editing information from the storage unit; a read unit configured to read data in the files based on acquired editing information; a creating unit configured to create a single file as an edited result from read data; a transmitting unit configured to transmit the edited result to the receiving apparatus, and the receiving apparatus includes: a receiving unit configured to receive the edited result from the edited result transmitting unit.

10 Claims, 14 Drawing Sheets

FIG. 8

```
1  <?xml version="1.0" encoding="UTF-8"?>
2  <smil xmlns="urn:schemas-professionalDisc:edl:editList"
3  umid="060A2B34010101050101010D1213000000001122334455667788899AABBCCDDEEFF"
4  xmlns:xsi="http://www.w3.org/2001/XMLSchema-instance"
5  xsi:schemaLocation="urn:schemas-professionalDisc:edl:editList
6  edl_editlist.xsd">
7    <body>
8      <par>
9        <!-- Clip1 -->
10       <ref
11       src="urn:smpte:umid:060A2B34010101050101010D1213000000FEDCBA9876543210FEDCBA9876543210"
12       begin="smpte-30=00:00:00:00"
13       clipBegin="smpte-30=00:00:00:00" clipEnd="smpte-30=00:10:00:00"/>
14
15       <!-- Clip2 -->
16       <ref
17       src="urn:smpte:umid:060A2B34010101050101010D1213000000EDCBA9876543210FEDCBA9876543210F"
18       begin="smpte-30=00:10:00:00"
19       clipBegin="smpte-30=00:00:00:00" clipEnd="smpte-30=00:05:30:00"/>
20     </par>
21   </body>
22 </smil>
```

TRANSMITTER-RECEIVER SYSTEM, INFORMATION PROCESSING APPARATUS, INFORMATION PROCESSING METHOD AND PROGRAM

CROSS REFERENCES TO RELATED APPLICATIONS

The present invention contains subject matter related to Japanese Patent Application JP 2005-343191 filed in the Japanese Patent Office on Nov. 29, 2005, the entire contents of which being incorporated herein by reference.

BACKGROUND OF THE INVENTION

1. Field of the Invention

The present invention relates to a transmitter-receiver system, an information processing apparatus, an information processing method, and a program, particularly to a transmitter-receiver system, an information processing apparatus, an information processing method, and a program which can acquire an edited result of data in a plurality of files as a single file to curtail costs on the acquisition side.

2. Description of the Related Art

In recent years, "CAMCORDER (Registered Trademark of Sony Corporation)" video cameras become widely available, which record material data such as image data and sound data acquired by shooting and recording on a recording medium such as a DVD (Digital Versatile Disk) Some of the video cameras can edit material data.

For example, the video camera edits material data by adding information about mark-in or mark-out to a single file of material data based on the edit operation by a user. When the material data after edited thus obtained is transmitted to another device such as a server, the another device reproduces the material data based on information about mark-in or mark-out added to the material data after edited, and then images and sounds corresponding to the material data after edited are outputted (for example, see JP-A-2003-150494 (pages 15 to 16) (Patent Reference 1)).

In addition, a process will be described with reference to FIG. 1 when a video camera supplies material data that is the edited result of a plurality of files to a material using unit that uses the material data.

The video camera shown in FIG. 1 is connected to the material using unit through a network. In addition, it is supposed that the material using unit shown in FIG. 1 creates and stores an edit list that is information about material data after edited (edited result) therein based on the edit operation by a user.

At Step S11, the material using unit interprets the stored edit list in response to an instruction from the user, and the process goes to Step S12. At Step S12, the material using unit makes a request to the video camera for the edit section of material data in file #1 (material data in file #1 configuring the edited result) based on the edit list over the network. In addition, file #i (i=1, 2, and so on) represents the ith file configuring the edited result.

At Step S31, the video camera accepts the request for the edit section of the file #1, and the process goes to Step S32. At Step S32, the video camera reads the edit section of the file #1 out of the recording medium, transmits it to the material using unit over the network, and the process goes to Step S33.

After the process at Step S12, the process goes to Step S13. The material using unit receives the edit section of the file #1 from the video camera, and the process goes to Step S14. At Step S14, the material using unit makes a request to the video camera for the edit section of the file #2 based on the edit list, and the process goes to Step S15.

At Step S33, the video camera accepts the request for the edit section of the file #2, and the process goes to Step S34. At Step S34, the video camera reads the edit section of the file #2 out of the recording medium, and transmits it to the material using unit.

At Step S15, the material using unit receives the edit section of the file #2 from the video camera. After that, the similar process steps are repeated. Among the files #1 to #N that are the files all configuring the edited result, the edit sections of the files #1 to #N−1 are transmitted from the video camera to the material using unit.

After that, the process goes to Step S16, the material using unit makes a request to the video camera for the edit section of the file #N, and then, the process goes to Step S17.

At Step S35, the video camera accepts the request for the edit section of the file #N, and the process goes to Step S36. At Step S36, the video camera reads the edit section of the file #N out of the recording medium, and transmits it to the material using unit, and the process is ended.

At Step S17, the material using unit receives the edit section of the file #N, and the process goes to Step S18. At Step S18, the material using unit joins (completes) the edit sections of the files #1 to #N received from the video camera, and acquires a single file as an edited result file.

SUMMARY OF THE INVENTION

However, in the process shown in FIG. 1, it is necessary to do such a complicated process that the material using unit interprets the edit list, reads the edit sections of the plurality of the files configuring the edited result out of the video camera based on the edit list, and connects the edit sections.

Therefore, it is necessary to use a special purpose unit provided with a function to do the complicated process, or a personal computer in which software corresponding to the function is downloaded as the material using unit, and costs for the material using unit are increased more than the case in which a multipurpose personal computer is used as the material using unit, for example.

In view of the above, it is desirable to acquire the edited result of data in a plurality of files as a single file, allowing a reduction in costs on the acquisition side.

A transmitter-receiver system according to a first embodiment of the invention includes: a transmitting apparatus configured to transmit an edited result obtained in consequence of editing data in a plurality of files; and a receiving apparatus configured to receive the edited result transmitted from the transmitting apparatus, wherein the transmitting apparatus includes: a storage unit configured to store the plurality of the files and editing information that is information about the edited result; an acquiring unit configured to acquire the editing information from the storage unit; a read unit configured to read data in the files based on editing information acquired by the acquiring unit; a creating unit configured to create a single file as an edited result from data read by the read unit; and a transmitting unit configured to transmit the edited result created by the creating unit to the receiving apparatus, and the receiving apparatus includes: a receiving unit configured to receive the edited result transmitted from the edited result transmitting unit.

An information processing apparatus according to a second embodiment of the invention includes: a storage unit configured to store a plurality of files and editing information that is information about an edited result obtained in consequence of editing data in the plurality of the files; an acquiring unit configured to acquire the editing information from the storage unit; a read unit configured to read data in the files based on editing information acquired by the acquiring unit; a creating unit configured to create a single file as an edited result from data read by the read unit; and a transmitting unit configured to transmit the edited result created by the creating unit.

The creating unit may include: a decoder configured to decode data read by the read unit; a joining unit configured to join a plurality of items of data decoded by the decoder; an encoder configured to encode data joined by the joining unit; and an adding unit configured to arrange data encoded by the encoder in a body and to add a header and a footer to the body to create an edited result.

The acquiring unit may acquire the editing information from the storage unit in response to a request from another information processing apparatus, and the transmitting unit transmits the edited result corresponding to the request to the another information processing apparatus.

An information processing method according to a third embodiment of the invention is an information processing method of an information processing apparatus having a storage unit configured to store a plurality of files and editing information that is information about an edited result obtained in consequence of editing data in the plurality of the files, the information processing method including the steps of: acquiring the editing information from the storage unit; reading data in the files based on acquired editing information; creating a single file as an edited result from the read data; and transmitting the created edited result.

A program according to a fourth embodiment of the invention is a program configured to allow a computer to control an information processing apparatus having a storage unit configured to store a plurality of files and editing information that is information about an edited result obtained in consequence of editing data in the plurality of the files, the program including the steps of: acquiring the editing information from the storage unit; reading data in the files based on acquired editing information; creating a single file as an edited result from the read data; and transmitting the created edited result.

In the first embodiment of the invention, the editing information is acquired from the storage unit configured to store the plurality of the files and the editing information that is information about the edited result. Data in the files is read based on the acquired editing information. A single file is created as the edited result from the read data. The created edited result is transmitted to the receiving apparatus Then, the transmitted edited result is received.

In the second embodiment of the invention, the editing information is acquired from the storage unit configured to store the plurality of the files and the editing information that is information about an edited result obtained in consequence of editing data in the plurality of the files. Data in the files is read based on the acquired editing information. A single file is created as the edited result from the read data. The created edited result is transmitted.

As described above, according to the embodiments of the invention, the edited result of data in a plurality of files can be easily created as a single file.

In addition, according to the embodiments of the invention, costs on the acquisition side can be curtailed that acquire the edited result of data in a plurality of files as a single file.

BRIEF DESCRIPTION OF THE DRAWINGS

FIG. 8 shows a diagram depicting an exemplary edit list;

DETAILED DESCRIPTION OF THE INVENTION

Figure 1:
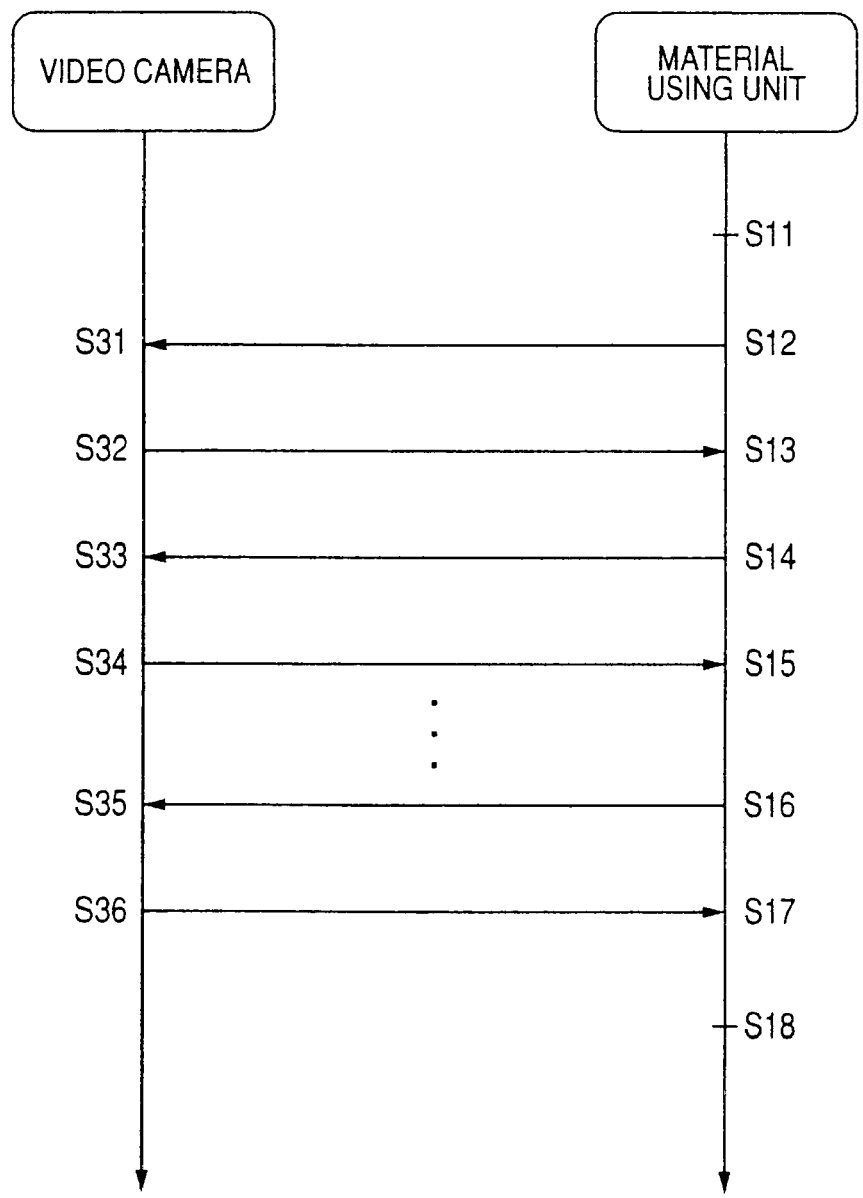
FIG. 1 shows a flow chart illustrative of exemplary process steps when a video camera provides material data that is an edited result.

Hereinafter, embodiments of the invention will be described. The following is examples of the correspondence between configuration requirements for the invention and the embodiments in the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

A transmitter-receiver system according to a first embodiment of the invention is a transmitter-receiver system (for example, a network system 1 shown in FIG. 2) includes: a transmitting apparatus (for example, a video camera 21 shown in FIG. 2) configured to transmit an edited result obtained in consequence of editing data in a plurality of files; and a receiving apparatus (for example, a material using unit 29 shown in FIG. 2) configured to receive the edited result transmitted from the transmitting apparatus, wherein the transmitting apparatus includes: a storage unit (for example, a removable medium 33 shown in FIG. 2) configured to store the plurality of the files and editing information (for example, an edit list) that is information about the edited result; an acquiring unit (for example, an acquiring part 172 shown in FIG. 4) configured to acquire the editing information from the storage unit; a read unit (for example, a reading part 173 shown in FIG. 4) configured to read data in the files based on editing information acquired by the acquiring unit; a creating unit (for example, an adding part 179 shown in FIG. 4) configured to create a single file as an edited result from data read by the read unit; and a transmitting unit (for example, a transmitting part 180 shown in FIG. 4) configured to transmit the edited result created by the creating unit to the receiving apparatus, and the receiving apparatus includes: a receiving unit (for example, a communicating part 209 shown in FIG. 5) configured to receive the edited result transmitted from the edited result transmitting unit.

An information processing apparatus according to a second embodiment of the invention is an information processing apparatus including: a storage unit (for example, the removable medium 33 shown in FIG. 2) configured to store a plurality of files and editing information (for example, the edit list) that is information about an edited result obtained in consequence of editing data in the plurality of the files; an acquiring unit (for example, shown in FIG. 4 the acquiring part 172) configured to acquire the editing information from the storage unit; a read unit (for example, shown in FIG. 4 the reading part 173) configured to read data in the files based on editing information acquired by the acquiring unit; a creating unit (for example, the adding part 179 shown in FIG. 4) configured to create a single file as an edited result from data read by the read unit; and a transmitting unit (for example, the transmitting part 180 shown in FIG. 7) configured to transmit the edited result created by the creating unit.

In the information processing apparatus according to the second embodiment of the invention, the creating unit includes: a decoder (for example, shown in FIG. 4 a decoder 175) configured to decode data read by the read unit; a joining unit (for example, a synthesizing part 176 shown in FIG. 4) configured to join a plurality of items of data decoded by the decoder; an encoder (for example, an encoder 178 shown in FIG. 4) configured to encode data joined by the joining unit; and an adding unit (for example, the adding part 179 shown in FIG. 4) configured to arrange data encoded by the encoder in a body and to add a header and a footer to the body to create an edited result.

Figure 10:
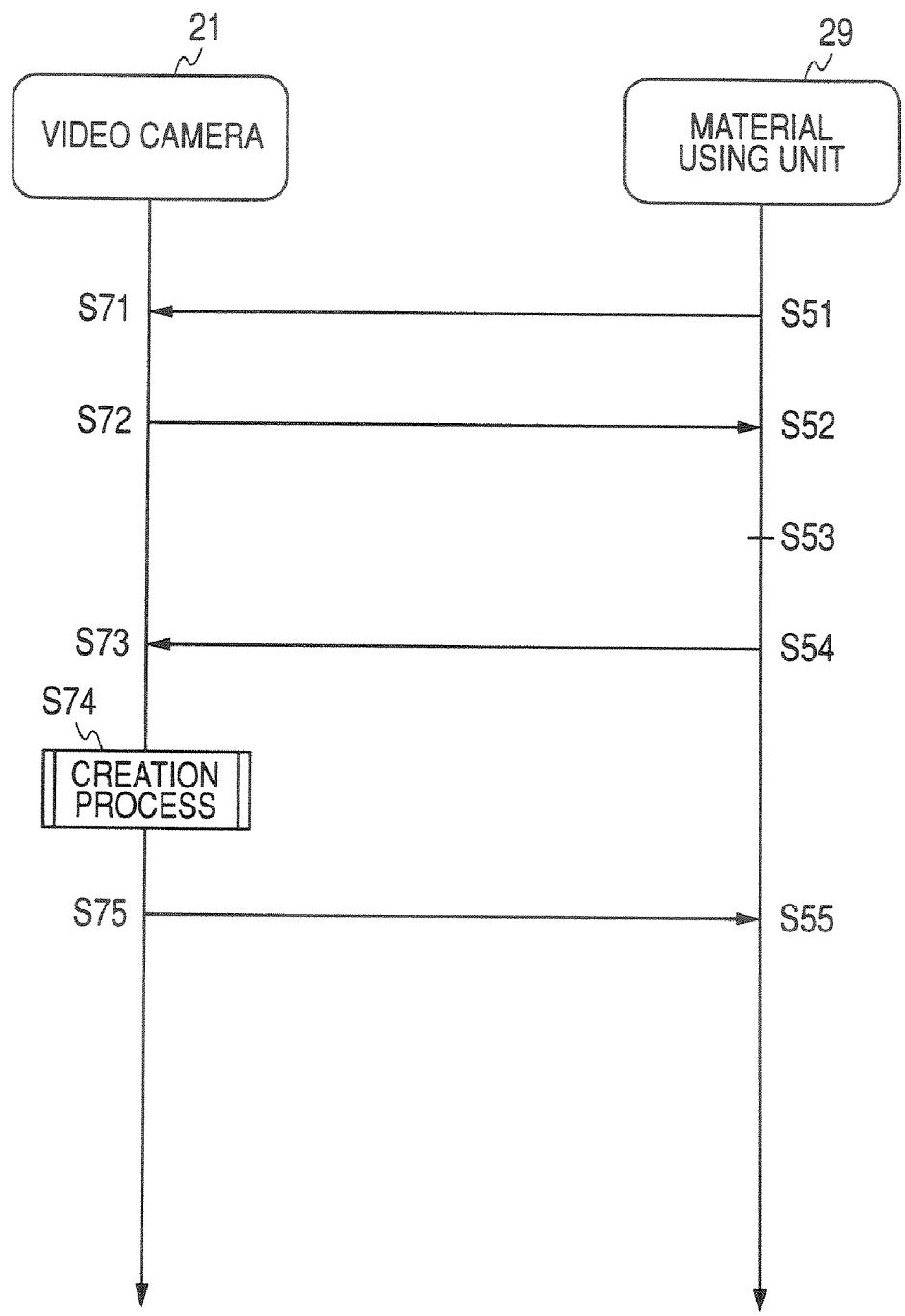
FIG. 10 shows a flow chart illustrative of an acquisition process to acquire an edited result.

In the information processing apparatus according to the second embodiment of the invention, the acquiring unit acquires the editing information from the storage unit in response to a request from another information processing apparatus (for example, a process step at Step S91 shown in FIG. 11), and the transmitting unit transmits the edited result corresponding to the request to the another information processing apparatus (for example, a process step at Step S75 shown in FIG. 10).

An information processing method according to a third embodiment of the invention is an information processing method of an information processing apparatus having a storage unit (for example, the removable medium 33 shown in FIG. 2) configured to store a plurality of files and editing information (for example, the edit list) that is information about an edited result obtained in consequence of editing data in the plurality of the files, the information processing method including the steps of: acquiring the editing information from the storage unit (for example, Step S91 shown in FIG. 11); reading data in the files based on acquired editing information (for example, Step S94 shown in FIG. 11); creating a single file as an edited result from the read data (for example, Step S100 shown in FIG. 11); and transmitting the created edited result (for example, Step S75 shown in FIG. 10).

A program according to a fourth embodiment of the invention is a program configured to allow a computer to control an information processing apparatus having a storage unit (for example, the removable medium 33 shown in FIG. 2) configured to store a plurality of files and editing information (for example, the edit list) that is information about an edited result obtained in consequence of editing data in the plurality of the files, the program including the steps of: acquiring the editing information from the storage unit (for example, Step S91 shown in FIG. 11); reading data in the files based on acquired editing information (for example, Step S94 shown in FIG. 11); creating a single file as an edited result from the read data (for example, Step S100 shown in FIG. 11); and transmitting the created edited result (for example, Step S75 shown in FIG. 10).

Hereinafter, a specific embodiment to which an embodiment of the invention is adapted will be described in detail with reference to the drawings.

Figure 2:
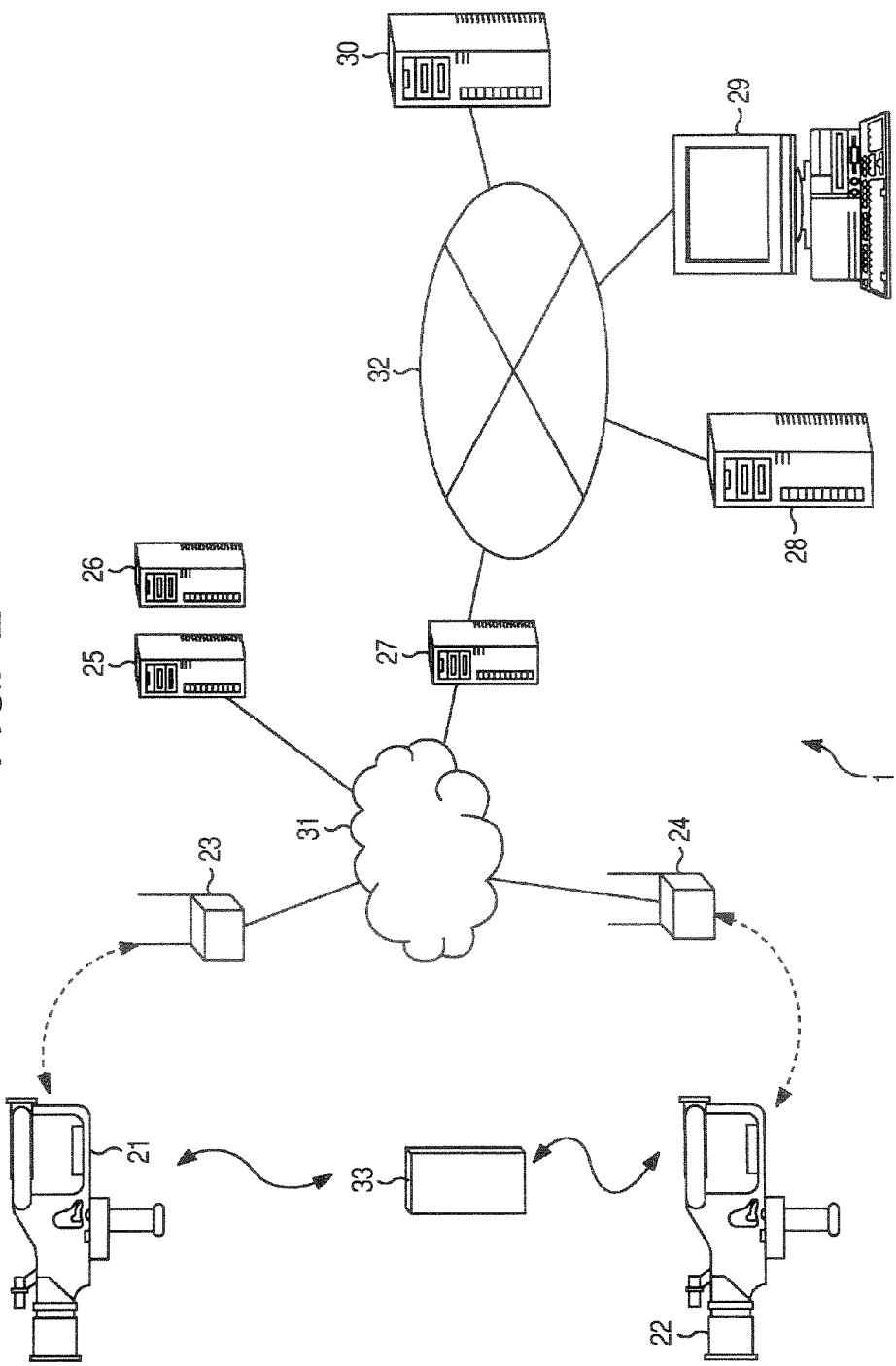
FIG. 2 shows a diagram depicting an exemplary configuration of a network system to which an embodiment of the invention is adapted.

FIG. 2 shows an exemplary configuration of a network system 1 to which an embodiment of the invention is adapted.

For example, the network system 1 shown in FIG. 2 is a program production support system for use in production of television programs. The process steps of production of a television program are basically categorized into planning (construction), recording and editing (production). Planning (construction) is the process step of controlling the overall production of a television program which planes and conceives a television program to be produced to create the scenario (script) of the television program.

For example, recording is the process step of actually recording at a production site in accordance with a production instruction and a scenario, which acquires material data such as image data and sound data in each scene configuring the television program as well as records the shooting situations (including taking sounds) Editing (production) is the process step of editing material data acquired by recording, or adding other information not acquired by recording (CG/SI (Computer Graphics/Superimpose), narration, or library shot, music and the like) to material data acquired by recording, or to material data after edited (an edited result) based on the production instruction and the scenario to produce a full package that is data (material data) completed as a television program.

The network system 1 shown in FIG. 2 is a program production support system configured to support work at each of the process steps. The network system 1 is configured of video cameras 21 and 22, access points 23 and 24, servers 25 and 26, a firewall 27, a material server 28, a material using unit 29, a full package server 30, a network 31, and an intranet 32.

The video cameras 21 and 22 are a device for use in recording a news program that is a television program, and a sport game, and in shooting a motion picture (including taking sounds), etc. The video cameras 21 and 22 record material data acquired by shooting a subject in a removable medium 33 or a material memory (described later in FIG. 3) such as a magnetic disc, an optical disc including DVD (Digital Versatile Disc), a magneto-optical disc, a memory card, removable hard disk drive, etc. In addition, the video cameras 21 and 22 are connected to the access point 23 or 24 through radio, and transmit material data to the other devices (the material using unit 29 and so on) over the network 31 such as the Internet connected to the access points 23 and 24.

In addition, the video cameras 21 and 22 reproduce material data from the removable medium 33 mounted to the video cameras 21 and 22, and transmit it to the other devices. Furthermore, the video cameras 21 and 22 create information to be useful in edit processing at a later stage, for example, like information related to recording based on user entry, and associate it as metadata with material data acquired in the video cameras 21 and 22.

To the video cameras 21 and 22, the servers 25 and 26 are connected through the access point 23 or 24 and the network 31. To the servers 25 and 26, the material data acquired by the video cameras 21 and 22 is supplied and recorded as necessary.

The intranet 32 is connected to the network 31 through the firewall 27, and the firewall 27 protects unauthorized access to the intranet 32 from the network 31.

To the intranet 32, the material server 28, the material using unit 29, and the full package server 30 are also connected.

The material server 28 stores material data supplied from the material using unit 29 through the intranet 32. The material using unit 29 records material data transmitted (uploaded)) from the video cameras 21 and 22 through the access point 23 or 24, the network 31, the firewall 27, and the intranet 32. In addition, the material using unit 29 supplies the recorded material data to the material server 28.

Furthermore, the material using unit 29 reads material data stored therein or material data stored in the material server 28, and creates a full package. Then, the material using unit 29 supplies the full package to the full package server 30 through the intranet 32. The full package server 30 stores the full package supplied from the material using unit 29.

In addition, hereinafter, when it is unnecessary to distinguish between the video cameras 21 and 22, they are collectively called the video camera 21. In addition, when it is unnecessary to distinguish between the access points 23 and 24, they are collectively called the access point 23.

Figure 3:
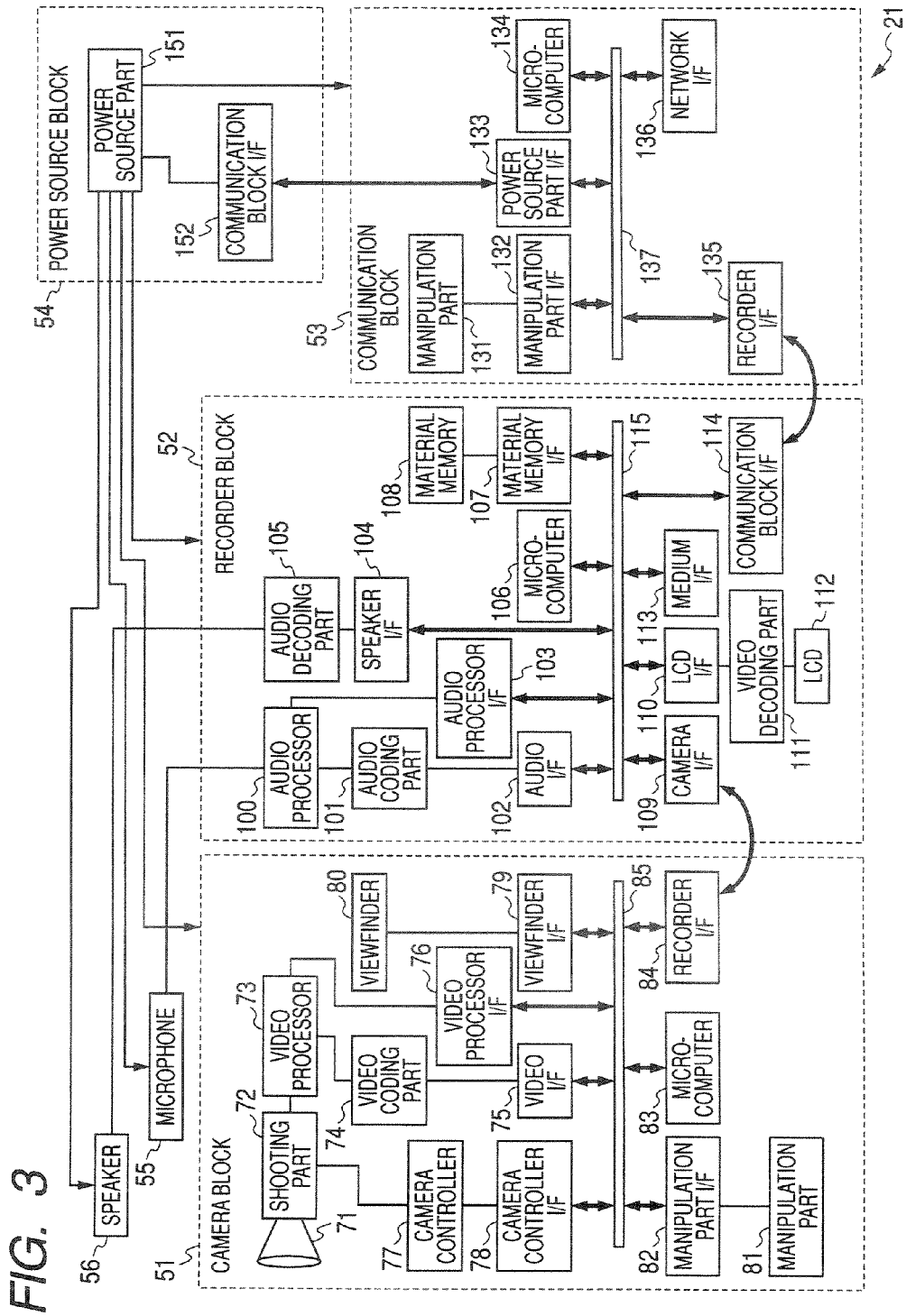
FIG. 3 shows a block diagram depicting an exemplary hardware configuration of a video camera shown in FIG. 2.

FIG. 3 shows a block diagram depicting an exemplary hardware configuration of the video camera 21 shown in FIG. 2.

The video camera 21 shown in FIG. 3 is configured of a camera block 51, a recorder block 52, a communication block 53, a power source block 54, a microphone 55, and a speaker 56.

The camera block 51 is configured of a lens part 71, a shooting part 72, a video processor 73, a video coding part 74, a video I/F (Interface) 75, a video processor I/F 76, a camera controller 77, a camera controller I/F 78, a viewfinder I/F 79, a viewfinder 80, a manipulation part 81, a manipulation part I/F 82, a microcomputer 83, a recorder I/F 84, and a bus 85, and the block shoots a subject and supplies resulted image data (video data) to the recorder block 52.

The shooting part 72 is configured of a CCD (Charge Coupled Device), for example, and acquires the light from the subject through the lens part 71 to shoot the subject. The shooting part 72 supplies to the video processor 73 an image signal which is an analog signal in consequence of shooting. The video processor 73 performs processes such as A/D (Analog/Digital) conversion and adjusting an image for the image signal from the shooting part 72. The video processor 73 supplies image data that is the resulted digital data to the video coding part 74 or the video processor I/F 76.

The video coding part 74 compresses and encodes image data from the video processor 73 in accordance with MPEG (Moving Picture Experts Group) 2 system, for example, and supplies the resulted image data to the video I/F 75.

The video I/F 75, the video processor I/F 76, the camera controller I/F 78, the viewfinder I/F 79, the manipulation part I/F 82, the microcomputer 83, and the recorder I/F 84 are connected to one another through the bus 85.

The video I/F 75 supplies image data supplied from the video coding part 74 to the recorder I/F 84 through the bus 85. The video processor I/F 76 supplies image data supplied from the video processor 73 to the viewfinder I/F 79 through the bus 85.

The camera controller 77 controls the shooting part 72 to control a diaphragm and zooming based on a control signal supplied from the camera controller I/F 78. The camera controller I/F 78 supplies the control signal supplied from the microcomputer 83 through the bus 85 to the camera controller 77.

The viewfinder I/F 79 supplies image data supplied from the video processor I/F 76 or the recorder I/F 84, or various items of metadata supplied from the recorder I/F 84 to the viewfinder 80. The viewfinder 80 displays an image corresponding to image data or metadata supplied from the viewfinder I/F 79.

The manipulation part 81 accepts user manipulation to the camera block 51 (for example, an instruction for shooting), and supplies a camera manipulation signal that indicates the manipulation to the manipulation part I/F 82. The manipulation part I/F 82 supplies the camera manipulation signal supplied from the manipulation part 81 to the microcomputer 83 through the bus 85.

For example, the microcomputer 83 is configured of a CPU (Central Processing Unit), a ROM (Read Only Memory), and a RAM (Random Access Memory). The CPU of the microcomputer 83 runs a program stored in the ROM to control each part in the camera block 51 based on the camera manipulation signal from the manipulation part 81. For example, the CPU supplies the control signal to the camera controller 77 through the bus 85 and the camera controller I/F 78, and controls a diaphragm and zooming.

In addition, the RAM of the microcomputer 83 properly stores a program and data run by the CPU therein. The recorder I/F 84 exchanges data with the recorder block 52. For example, the recorder I/F 84 supplies image data or metadata supplied from a camera I/F 109 in the recorder block 52 to the viewfinder I/F 79 through the bus 85. In addition, the recorder I/F 84 supplies image data supplied from the video I/F 75 to the recorder block 52.

The recorder block 52 is configured of an audio processor 100, an audio coding part 101, an audio I/F 102, an audio processor I/F 103, a speaker I/F 104, an audio decoding part 105, a microcomputer 106, a material memory I/F 107, a material memory 108, the camera I/F 109, an LCD (Liquid Crystal Display) I/F 110, a video decoding part 111, an LCD 112, a medium I/F 113, a communication block I/F 114, and a bus 115, and the block records material data such as image data acquired by the camera block 51 and sound data corresponding to a sound signal that is an analog signal acquired by the microphone 55.

The audio processor 100 performs processes such as A/D conversion and adjusting sounds for the sound signal supplied from the microphone 55. The audio processor 100 supplies sound data (audio data) that is the resulted digital data to the audio coding part 101 and the audio processor I/F 103. The audio coding part 101 compresses and encodes sound data supplied from the audio processor 100 in the system corresponding to the linear PCM (Pulse Code Modulation) format, for example, and supplies the resulted sound data to the audio I/F 102.

The audio I/F 102, the audio processor I/F 103, the speaker I/F 104, the microcomputer 106, the material memory I/F 107, the camera I/F 109, the LCD I/F 110, the medium I/F 113, and the communication block I/F 114 are connected to one another through the bus 115.

The audio I/F 102 supplies sound data supplied from the audio coding part 101 to the material memory 108 or the medium I/F 113 through the bus 115. The audio processor I/F 103 supplies sound data supplied from the audio processor 100 to the speaker I/F 104 as it is through the bus 115.

The speaker I/F 104 supplies sound data supplied from the audio processor I/F 103, the material memory I/F 107, or the medium I/F 113 to the audio decoding part 105. The audio decoding part 105 decodes sound data as necessary. The audio decoding part 105 supplies the resulted sound data to the speaker 56, and outputs sounds corresponding to the sound data from the speaker 56.

For example, the microcomputer 106 is configured of a CPU, a ROM, and a RAM. The CPU of the microcomputer 106 runs a program stored in the ROM to control each part in the recorder block 52 based on a communication manipulation signal that is supplied from the communication block I/F 114 and indicates user manipulation of the manipulation part 131.

For example, the CPU of the microcomputer 106 creates metadata of material data (non-real time metadata, described later) based on information about recording and various set values supplied from the medium I/F 113, etc.

In addition, the CPU of the microcomputer 106 creates disk metadata that is metadata of the entire data recorded on the removable medium 33, and other data. Furthermore, based on image data supplied from the camera I/F 109, the CPU of the microcomputer 106 creates proxy image data that has a lower resolution than that of the image data.

Furthermore, the CPU of the microcomputer 106 controls recording or reproduction over the material memory 108 and the removable medium 33.

In addition, the microcomputer 106 records and reproduces data in the material memory 108 or the removable medium 33 at the same time as necessary. At this time, the microcomputer 106 can reproduce data already recorded in a file currently recorded in the material memory 108 or the removable medium 33.

In addition, the CPU of the microcomputer 106 creates image data to display various screens, and supplies them to the LCD I/F 110. Furthermore, the CPU of the microcomputer 106 creates an edited result based on the edit list recorded in the material memory 108 or the removable medium 33, and supplies it to the communication block I/F 114. In addition, the RAM of the microcomputer 106 properly stores a program and data run by the CPU therein.

The material memory I/F 107 has fast access to the material memory 108, for example, and records or reproduces data from the material memory 108.

For example, under control by the microcomputer 106, the material memory I/F 107 supplies material data to the material memory 108, and stores the data as a file therein. In addition, under control by the microcomputer 106, the material memory I/F 107 supplies proxy image data to the material memory 108, and stores it as a file therein. Furthermore, under control by the microcomputer 106, the material memory I/F 107 supplies metadata (such as metadata of material data and disk metadata) to the material memory 108, and stores it as a file therein.

In addition, the material memory 1/F 107 reproduces material data from the material memory 108, and supplies sound data in the material data to the speaker I/F 104 and image data to the LCD I/F 110. Furthermore, the material memory I/F 107 reproduces the material data, the proxy image data, metadata and other data from the material memory 108, and supplies the data to the communication block I/F 114.

The camera I/F 109 is connected to the recorder I/F 84 in the camera block 51, and receives image data from the recorder I/F 84, for example. The camera I/F 109 supplies the image data to the microcomputer 106 through the bus 115 as well as supplies the image data to the material memory I/F 107 or the medium I/F 113. The LCD I/F 110 supplies the image data supplied from the material memory I/F 107 or the medium I/F 113 to the video decoding part 111.

The video decoding part 111 decodes the image data supplied from the LCD I/F 110 as necessary, and supplies the resulted image data to the LCD I/F 112. The LCD 112 displays an image corresponding to the image data supplied from the video decoding part 111.

Under control by the microcomputer 106, the medium I/F 113 supplies the material data to the removable medium 33, and stores it as a file. In addition, under control by the microcomputer 106, the medium I/F 113 supplies proxy image data to the removable medium 33, and stores it as a file. Furthermore, under control by the microcomputer 106, the medium I/F 113 supplies metadata (such as metadata of material data and disk metadata) to the removable medium 33, and stores it as a file therein.

Moreover, the medium I/F 113 reads information about recording and various set values recorded on the removable medium 33 mounted on the video camera 21, and supplies them to the microcomputer 106.

In addition, here, it is supposed that information about recording, various set values and other data are inputted from the removable medium 33 to the microcomputer 106 through the medium I/F 113. However, this scheme may be done in which a user manipulates the manipulation part 131 to enter information about recording, various set values and other data to the microcomputer 106.

In addition, the medium I/F 113 reproduces material data from the removable medium 33, and supplies sound data in the material data to the speaker I/F 104 and image data to the LCD I/F 110. Furthermore, the medium I/F 113 reproduces material data, proxy image data, metadata and other data from the removable medium 33, and supplies them to the communication block I/F 114.

The communication block I/F 114 is connected to a recorder I/F 135 (described later) in the communication block 53, and exchanges data with the communication block 53. For example, the communication block I/F 114 supplies the edit list that is supplied from the recorder I/F 135 in the communication block 53 and is information about an edited result in the material using unit 29 to the material memory I/F 107 or to the medium I/F 113, and stores the edit list in the material memory 108 or the removable medium 33.

In addition, the communication block I/F 114 supplies a communication manipulation signal supplied from the recorder I/F 135 to the microcomputer 106 through the bus 115.

Furthermore, the communication block I/F 114 supplies material data, proxy image data, metadata and other data supplied from the material memory I/F 107 or the medium I/F 113 to the recorder I/F 135, or supplies a camera manipulation signal supplied from the camera I/F 107 to the recorder I/F 135. In addition, the communication block I/F 114 supplies the edited result supplied from the microcomputer 106 to the recorder I/F 135.

The communication block 53 is configured of a manipulation part 131, a manipulation part I/F 132, a power source part I/F 133, a microcomputer 134, the recorder I/F 135, a network I/F 136, and a bus 137, and the block communicates data with the other devices through the access point 23, the network 31 and the other devices shown in FIG. 2 as well as controls the power source in the recorder block 52.

The manipulation part 131 accepts a manipulation (for example, an instruction for reproduction) to the recorder block 52 and the communication block 53, and supplies a communication manipulation signal indicating that manipulation to the manipulation part I/F 132. The manipulation part I/F 132, the power source part I/F 133, the microcomputer 134, the recorder I/F 135, and the network I/F 136 are connected to one another through the bus 137.

The manipulation part I/F 132 supplies the communication manipulation signal supplied from the manipulation part 131 to the microcomputer 134 or the recorder I/F 135 through the bus 137. The power source part I/F 133 supplies a power source control signal that is supplied from the microcomputer 134 through the bus 137 and controls the supply of power to the recorder block 52 to the communication block I/F 152 in the power source block 54.

For example, the microcomputer 134 is configured of a CPU, a ROM, and a RAM. The CPU of the microcomputer 134 runs a program stored in the ROM to control each part in the communication block 53 based on a communication manipulation signal supplied from the manipulation part 13. In addition, the CPU of the microcomputer 134 creates a power source control signal based on a detection signal that is supplied from the network I/F 136 and shows the detected result of the access point 23, and supplies it to the power source part I/F 133.

The RAM of the microcomputer 134 stores a program and data run by the CPU therein. For example, the RAM temporarily stores material data, proxy image data, or metadata therein that is supplied through the recorder I/F 135 and is transmitted over the network I/F 136. Thus, even when the reproduction rate of these items of data from the removable medium 33 exceeds the transmission rate, data can be surely transmitted.

The recorder I/F 135 is connected to the communication block I/F 114 in the recorder block 52, and supplies an edit list supplied from the network I/F 136 and a communication manipulation signal supplied from the manipulation part 132, for example, to the communication block I/F 114.

In addition, the recorder I/F 135 supplies material data, proxy image data, metadata, an edited result and other data supplied from the communication block I/F 114 to the network I/F 136.

The network I/F 136 communicates with the other devices (for example, the material using unit 29, etc.) through the access point 23, the network 31 and other devices shown in FIG. 2 in conformity with the FTP (File Transfer Protocol). For example, the network I/F 136 transmits material data, proxy image data, metadata and other data supplied from the recorder I/F 135 to the material using unit 29 through the access point 23, the network 31, the firewall 27, and the intranet 32 in order of metadata, proxy image data, and material data.

In addition, the network I/F 136 receives the edit list transmitted from the material using unit 29, for example, through the intranet 32, the firewall 27, the network 31, and the access point 23, and supplies it to the recorder I/F 135 through the bus 137. Furthermore, the network I/F 136 detects the access point 23, and supplies a detection signal that indicates the detected result to the microcomputer 134.

The power source block 54 is configured of a power source part 151 and a communication block I/F 152, and supplies power (electric power) to the camera block 51, the recorder block 52, the communication block 53, the microphone 55, and the speaker 56.

The power source part 151 controls the supply of power to the recorder block 52 based on a power source control signal supplied from the communication block I/F 152. The communication block I/F 152 supplies the power source control signal supplied from the power source part I/F 133 in the communication block 53 to the power source part 151.

In addition, hereinafter, for convenience of explanation, data such as material data, proxy image data, and metadata are considered to be recorded on the removable medium 33.

Figure 4:
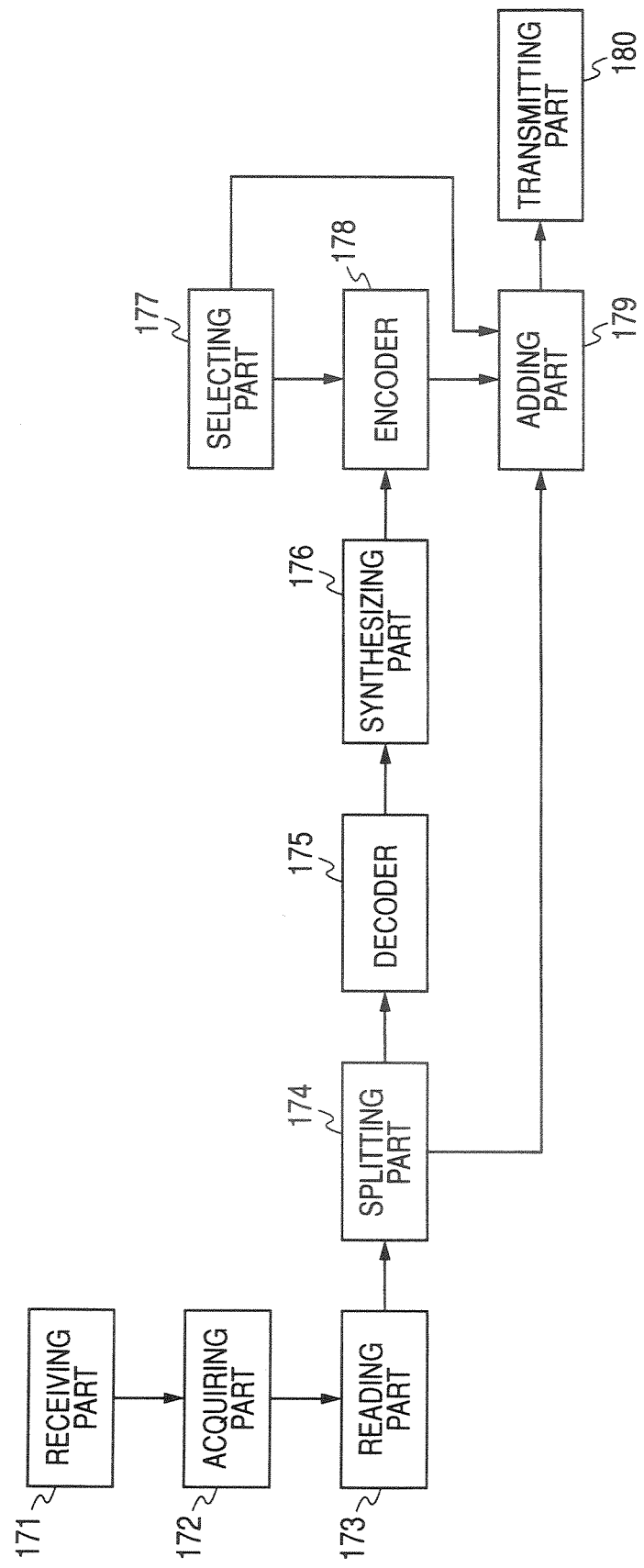
FIG. 4 shows a block diagram depicting an exemplary configuration of a function to create an edited result of a video camera shown in FIG. 3.

FIG. 4 shows a block diagram depicting an exemplary configuration of a function to create the edited result of the video camera 21 shown in FIG. 3.

The video camera 21 shown in FIG. 4 is configured of a receiving part 171, an acquiring part 172, a reading part 173, a splitting part 174, a decoder 175, a synthesizing part 176, a selecting part 177, an encoder 178, an adding part 179, and a transmitting part 180.

For example, the receiving part 171 and the transmitting part 180 correspond to the communication block 53 shown in FIG. 3. In addition, for example, the acquiring part 172, the reading part 173, the splitting part 174, the synthesizing part 176, the selecting part 177, and the adding part 179 correspond to the microcomputer 106 shown in FIG. 3. Furthermore, the decoder 175 corresponds to the audio decoding part 105 and the video decoding part 111, and the encoder 178 corresponds to the video coding part 74 and the audio coding part 101.

The receiving part 171 receives a request for the edited result from the material using unit 29. In response to the request, the receiving part 171 specifies an edit list corresponding to the edited result that is a target for the request, and makes a request to the acquiring part 172 to acquire the edit list file of the edit list (described later in FIG. 6).

In response to the request from the receiving part 171, the acquiring part 172 reads (acquires) the edit list file specified by the removable medium 33, and supplies it to the reading part 173. The reading part 173 reads a clip file of material data configuring the edited result (described later in FIG. 6) out of the removable medium 33 based on the edit list file, and supplies the clip file and the edit list file to the splitting part 174.

The splitting part 174 splits the clip file supplied from the reading part 173 into a header, a footer and a body. Then, the splitting part 174 extracts an edit section (material data configuring the edited result) from material data arranged in the body based on the edit list file, and supplies the edit section to the decoder 175 together with information about an encoding system included in information arranged in the header. In addition, the splitting part 174 supplies information arranged in the header and the footer to the adding part 179.

The decoder 175 decodes the edit section supplied from the splitting part 174 by the system corresponding to the encoding system from the splitting part 174, and supplies the resulted edit section to the synthesizing part 176. The synthesizing part 176 synthesizes edit sections corresponding to the edit list file supplied from the decoder 175, and supplies it to the encoder 178.

The selecting part 177 selects an encoding system desired by a user from encoding systems (for example, the MPEG (Moving Picture Experts Group) 2 system) encodable by the encoder 178 based on the communication manipulation signal. In other words, the user manipulates the manipulation part 131 to specify a desired encoding system as the encoding system for the edited result. Then, the selecting part 177 selects the encoding system specified by the user based on a communication manipulation signal that indicates that manipulation, and supplies information showing the encoding system to the encoder 178 and the adding part 179.

The encoder 178 encodes the edit section supplied from the decoder 175 by the encoding system based on information showing the encoding system from the selecting part 177. Then, the encoder 178 supplies the resulted edit section to the adding part 179. The adding part 179 creates a header and a footer to be added to a body in which the edit section supplied from the adding part 179 is arranged based on information supplied from the splitting part 174 and information supplied from the selecting part 177. Then, the adding part 179 adds the header and the footer to the body to create a single file as the edited result.

Then, the adding part 179 transmits the edited result to the transmitting part 180. The transmitting part 180 transmits the edited result supplied from the adding part 179 to the material using unit 29 and other devices through the access point 23, the network 31, etc.

In addition, when the encoding system for all the items of material data before editing is the in-frame encoding system and the encoding system for material data after edited (the edited result) is the same, it is unnecessary to dispose the decoder 175 and the encoder 178.

Figure 5:
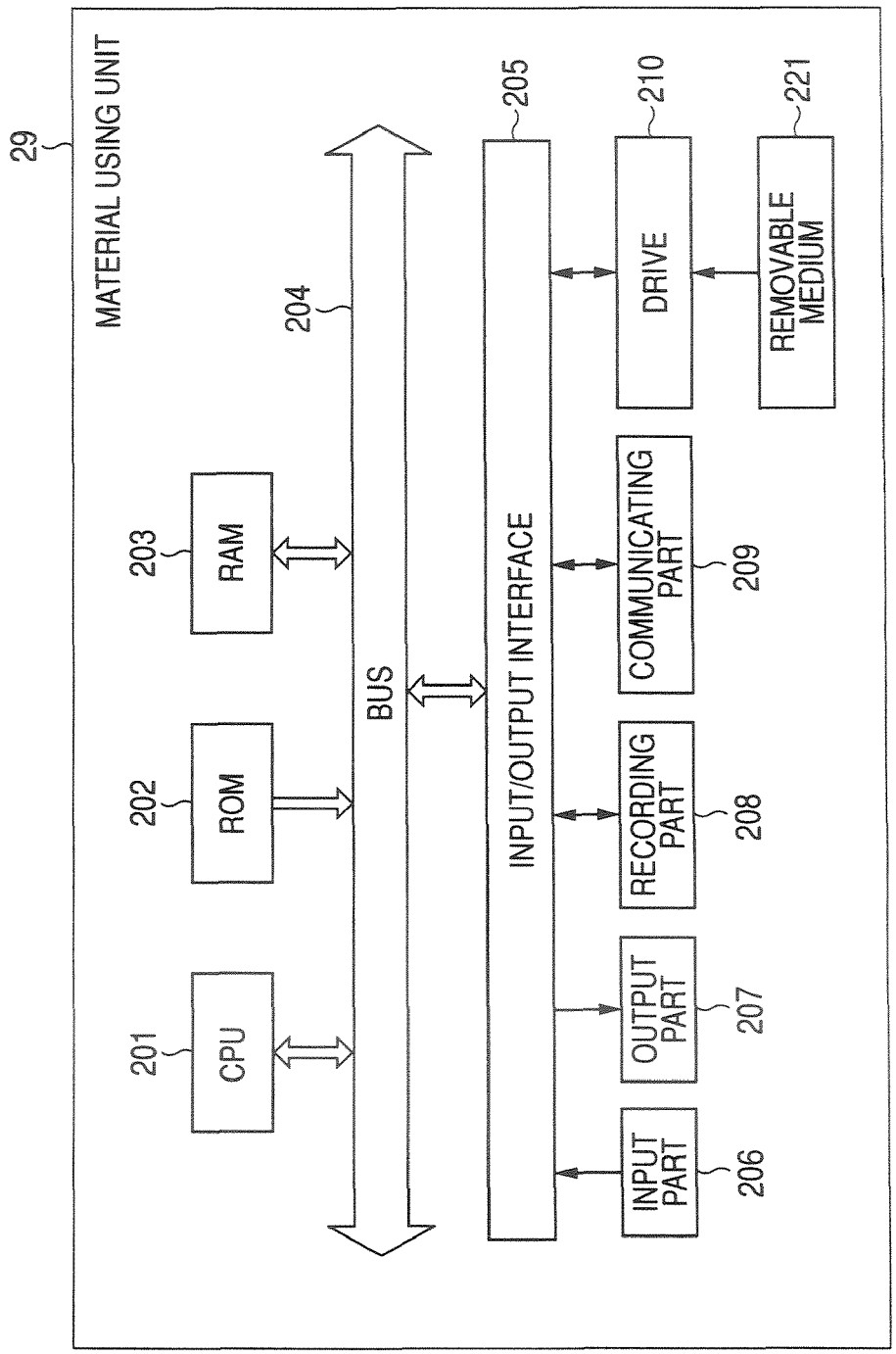
FIG. 5 shows a block diagram depicting an exemplary hardware configuration of a material using unit shown in FIG. 2.

FIG. 5 shows a block diagram depicting an exemplary hardware configuration of the material using unit 29 shown in FIG. 2.

The CPU 201 executes various processes in accordance with programs recorded in a ROM 202, or a recording part 208. For example, the CPU 201 edits material data recorded in the recording part 208, and creates an edit list that is information about the edited result. Then, the CPU 201 transmits the edit list to the video camera 21 through a communicating part 209.

A RAM 203 properly stores programs and data run by the CPU 201 therein. The CPU 201, the ROM 202, and the RAM 203 are connected to one another with a bus 204.

To the CPU 201, an input/output interface 205 is connected through the bus 204. To the input/output interface 205, an input part 206 configured of a receiving part which receives instructions transmitted from a keyboard, a mouse, a microphone, and a remote controller, not shown, and an output part 207 configured of a display and a speaker are connected. The CPU 201 executes various processes in response to the instruction inputted from the input part 206. Then, the CPU 201 outputs the processed result to the output part 207. For example, the CPU 201 creates image data to display various screens, and allows the output part 207 to display them.

The recording part 208 connected to the input/output interface 205 is configured of a hard disk, for example, and records programs and various items of data run by the CPU 201. The communicating part 209 communicates with external devices through the intranet 32. In addition, the communicating part 209 may acquire a program through the intranet 32 to record it in the recording part 208.

A drive 210 connected to the input/output interface 205 drives a removable medium 211 such as a magnetic disc, an optical disc, a magneto-optical disc, or a semiconductor memory when it is mounted, and acquires a program and data recorded thereon. The acquired program or data is forwarded to the recording part 208, and recorded as necessary.

Next, the directory structure of a file recorded on the removable medium 33 shown in FIG. 2 will be described with reference to FIG. 6.

Figure 6:
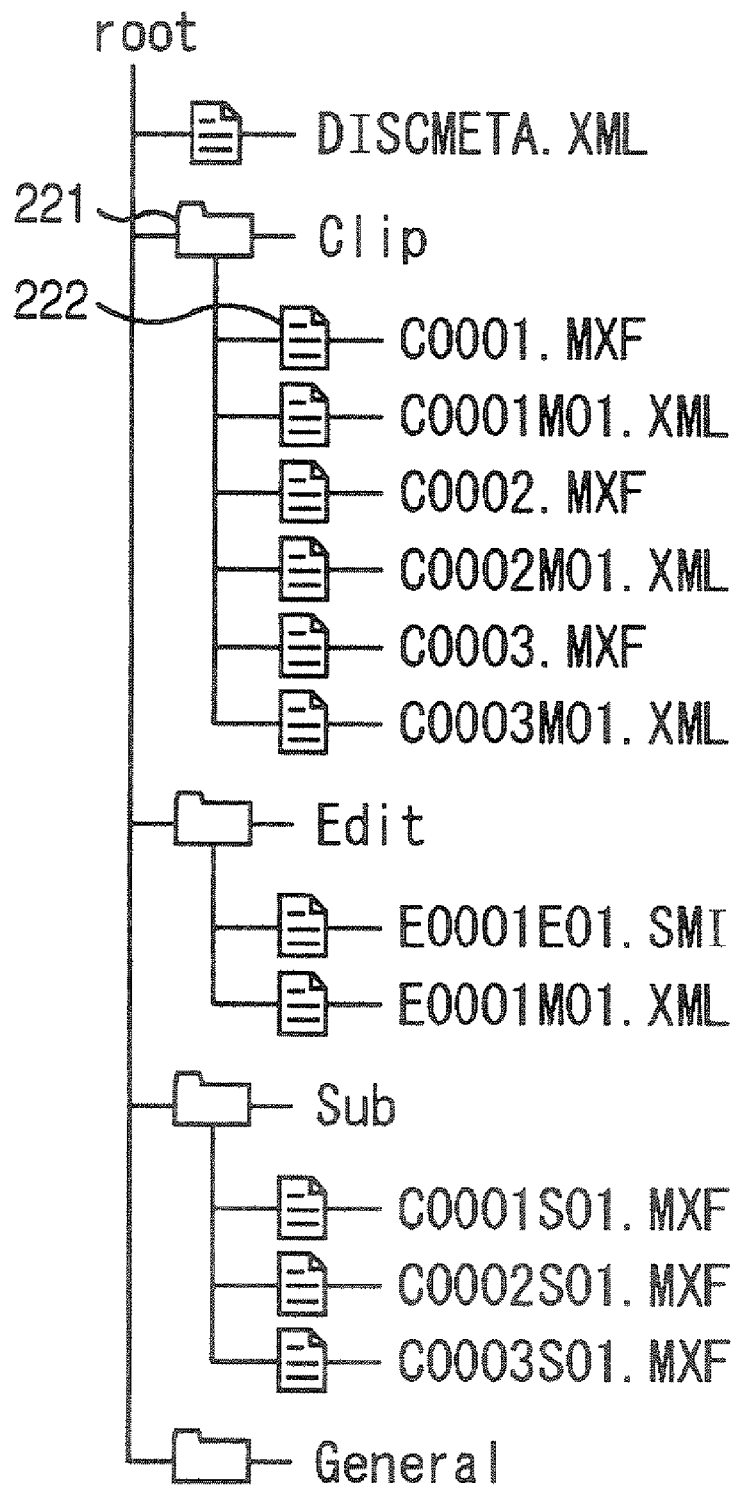
FIG. 6 shows a diagram illustrative of the directory structure of a file recorded on a removable medium.

In FIG. 6, a symbol 221 depicts a single directory. In addition, although no numerals and signs are shown, the other symbols that are the same as the symbol (directory) 221 also depict a single directory. In addition, the symbol 222 depicts a single file. Moreover, although no numerals and signs are shown, the other symbols that are the same as the symbol (file) 222 also depict a single file.

In addition, hereinafter, it is considered that the directory is the same as the symbol of the directory for discussion, as long as not particularly specified. Similarly, it is considered that the file is the same as the symbol of the file for discussion, as long as not particularly specified. Moreover, in order to easily distinguish between the individual directories and between the individual files, hereinafter, names thereof are described in brackets after the file or the directory.

In the example shown in FIG. 6, the removable medium 33 is a file of disk metadata that is metadata for entire data recorded on the removable medium 33. For example, a disc metafile (DISCMETA.XML) is provided that is a file containing information such as reproduction history.

In addition, the removable medium 33 is provided with a clip directory (Clip) 221 having files of clip material data and other data arranged at lower level, an edit list directory (Edit) having files of data of an edit list arranged at lower level, and a proxy directory (Sub) having files of clip proxy image data arranged at lower level.

In the clip directory (Clip) 221, clip material data and other data recorded on the removable medium 33 are recorded as different files for every clip.

In addition, the clip is a unit of the number of times for the shooting process done by the video camera 21. Other than this, the clip represents a unit showing the time from the start to the end of shooting in the shooting process, or a unit showing the length of various items of data obtained by the shooting process, or a unit showing the data volume of various items of data obtained by the shooting process. Furthermore, the clip sometimes shows an assembly of various items of data itself.

Here, for example, the clip represents an assembly of image data obtained by a single shooting process (the shooting process from the start to the end of shooting), sound data corresponding to the image data, metadata and other data.

More specifically, for example, FIG. 6 shows an example in which items of data of three clips are recorded on the removable medium 33.

In other words, for example, at the lower level of the clip directory 221, provided are a first clip file (C0001.MXF) 222 that is a file of material data of the first clip recorded on the removable medium 33, and a first non-real time metadata file (C0001M01.XML) that is a file containing metadata corresponding to the essence data of this clip and not demanded for being real time (hereinafter, called non-real time metadata).

In addition, in the example shown in FIG. 6, the non-real time metadata file (C0001M01.XML) is described in the XML format for general versatility.

In addition, at the lower level of the clip directory 221, as similar to the first clip file (C0001.MXF) 222 and the first non-real time metadata file (C0001M01.XML), the second clip file (C0002.MXF), a second non-real time metadata file (C0002M01.XML), a third clip file (C0003.MXF), and a third non-real time metadata file (C0003M01.XML) are provided.

In FIG. 6, in an edit directory (Edit) shown below the clip directory (Clip) 221 like this, edit lists recorded on the removable medium 33 are recorded as different files for every editing process.

For example, in the example shown in FIG. 6, at the lower level of the edit directory (Edit), provided are an edit list file (E0001E01.SMI) that is a file containing the edit list which is information about the edited result of the first-time editing process for the clips recorded on the removable medium 33, and an edit list metadata file (E0001M01.XML) that is a file containing metadata corresponding to the material data after edited (the portion extracted as material data after edited among items of material data of all the clips used for editing), or newly created metadata based on the metadata.

In addition, in FIG. 6, in a proxy directory (Sub) shown below the edit directory (Edit) like this, the proxy image data of clips recorded on the removable medium 33 is recorded as different files for every clip.

For instance, in the example shown in FIG. 6, at the lower level of the proxy directory (Sub), provided are a first proxy image file (C0001S01.MXF) that is a file of proxy image data of the first clip recorded on the removable medium 33, a second proxy image file (C0002S01.MXF) that is a file of proxy image data of the second clip, and a third proxy image file (C0003S01.MXF) that is a file of proxy image data of the third clip.

Figure 7:
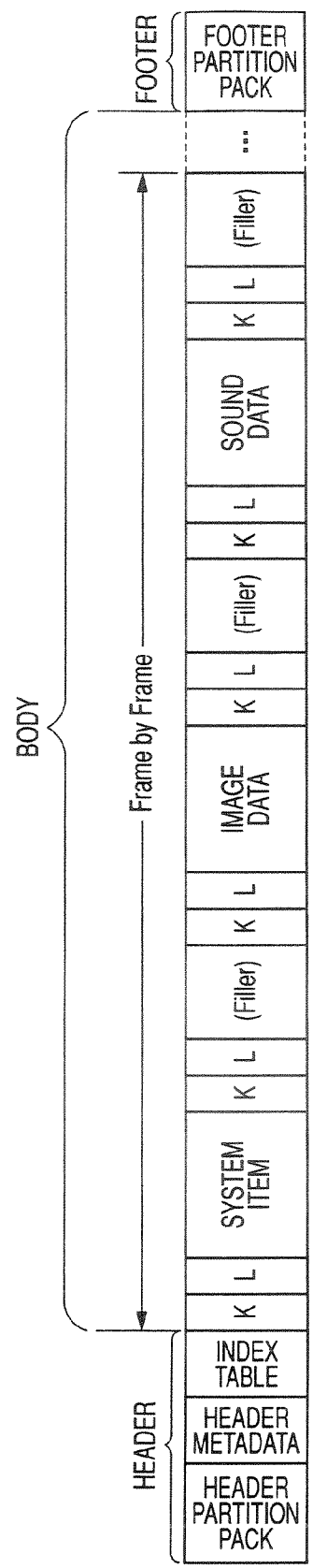
FIG. 7 shows a diagram depicting an exemplary format of a file configuring a clip directory shown in FIG. 6.

FIG. 7 shows an exemplary format of the clip file shown in FIG. 6.

Here, in FIG. 7, for material data arranged in the body, such a format is shown that adopts image data encoded by the MPEG2 system and sound data in the linear PCM format.

Moreover, in the body, in addition to those, image data in various formats such as DV (Digital Video) and sound data can be arranged.

As shown in FIG. 7, such a single clip of items of data is collectively arranged in a body that includes a system item in which a single frame of metadata demanded for being real time in a single frame (hereinafter, called real time metadata) image data encoded by the MPEG2 system, and sound data encoded by the linear PCM format. Furthermore, a header and a footer are added to the body to configure a clip file.

Here, the system item, the image data, and the sound data are encoded by KLV coding in a KLV (Key, Length, Value) structure.

The KLV structure is the structure in which Key, Length, and Value are sequentially arranged from the beginning, and in the Key, a 16-byte label is arranged that conforms to the SMPTE 298 M standards expressing what data is arranged in Value. In Length, the data length of data arranged in Value is placed. In Value, substantive data, here, that is, the system item in which a single frame of real time metadata is arranged, the image data, or the sound data are arranged.

In addition, the system item encoded by KLV coding, the image data, and the sound data have a fixed length whose data length is based on the KAG (KLV Alignment Grid). Then, in order to form the system item, the image data, and the sound data encoded by KLV coding to have the fixed length, a filler that is data for stuffing is also encoded in the KLV structure, and is placed after each of the system item encoded by KLV coding, the image data, and the sound data.

In the header, a header partition pack, header metadata, and an index table are sequentially arranged from the beginning. In the header partition pack, placed are partition metadata that is data showing a file format (for example, MXF (Material Exchange Format)), data showing the length of the body, the start position of the body and the data format (the encoding system) arranged in the body, etc. In the header metadata, for example, placed are a UMID (Unique Material Identifier), a beginning time code, date of creation of the file, information about data arranged in the body (for example, the pixel number of an image, an aspect ratio, etc.), metadata in units of files such as non-real time metadata.

In addition, the UMID is an identifier unique to a clip for identifying each of clips in a globally unique manner, which expresses an identifier defined by SMPTE (Society of Motion Picture and Television Engineers). In addition, in the header, various items of optional data can be placed.

In the index table, such data is placed that manages data arranged in the body. The footer is configured of a footer partition pack, and in the footer partition pack, such data is placed that identifies the footer.

In addition, non-real time metadata arranged in header metadata configures a non-real time metadata file.

FIG. 8 shows an exemplary edit list for the edit list file (E0001E01.SML) shown in FIG. 6.

In other words, FIG. 8 is a diagram depicting specific exemplary descriptions of the edit list file described in XML. In addition, in FIG. 8, numerics at the beginning of each row are added for convenience of explanation, not a part of XML descriptions.

The edit list file is a file containing editing information about nondestructive editing of clips, and also has the descriptions of the reproduction method of the edited result.

As shown in FIG. 8, the XML descriptions of the edit list file are mainly configured of a body part surrounded by body tags (<body>, </body>). In the example shown in FIG. 8, the body part is described from lines 7 to 21. In addition, at liens 1 to 6, information is described which shows that the file is the edit list for a professional disc.

In detail, in the body part, information is described that relates to temporal behavior of editing descriptions. In the example shown in FIG. 8, par elements described between the start tag "<par>" at line 8 and the end tag "</par>" at line 20 is a time container, which defines a simple time group to reproduce a plurality of elements at the same time. In the example shown in FIG. 8, the description is to reproduce a first clip (in the example shown in FIG. 8, it is described as Clip 1, for example, it is considered to be the clip of the clip file (C0001) shown in FIG. 6) and a second clip (in the example shown in FIG. 8, it is described as Clip 2, for example, it is considered to be the clip of the clip file (C0002) shown in FIG. 6) at the same time. However, in the case of the example shown in FIG. 8, as described later, the start times to reproduce the two clips are shifted to each other. In practice, the two clips are described to sequentially reproduce.

In FIG. 8, in ref elements at lines 10 to 13, descriptions are the file to be referenced and the conditions in reproducing the file to be referenced. The description "src="urn:smpte:umid: 060A2B340101010501010D1213000000FEDCBA987654 3210FEDCBA9876543210"" at line 11 shows that the UMID assigned to the reference file is "060A2B 340101010501010D1213000000FEDCBA9876543210FE DCBA9876543210".

In addition, the description "begin="smpte-30=00:00:00: 00"" at line 12 shows the time to start the first clip, that is, showing the position on the FTC (File Time Code) for the edit list at which material data is started, and a unit is the number of frames. In addition, the description "smpte-30" shows that the time code to be used is the SMPTE time code for 30 frames per second defined by SMPTE.

In addition, the description "clipBegin="smpte-30=00:00: 00:00"" at line 13 shows the position at which the first clip is started to reproduce, that is, showing the start position of the edit section on FTC of the first clip, and a unit is the number of frames. The description "clipEnd="smpte-30-00:10:00: 00"" (at line 13) following the description shows the position at which the first clip is finished to reproduce, that is, showing the position at which the edit section is ended on FTC of the first clip.

As described above, in the example shown in FIG. 8, the edit list describes that the first clip is started to reproduce at the time "00:00:00:00" from the position of the frame number "00:00:00:00" to the position of the frame number "00:10: 00:00".

In addition, for the second clip, it is similarly described to the case of the first clip at lines 15 to 19. In the example shown in FIG. 8, the edit list describes that the second clip is started to reproduce at the time "00:10:00:00" from the position of the frame number "00:00:00:00" to the position of the frame number "00:05:30:00".

Then, in the edit list shown in FIG. 8, the par elements specify that the first clip and the second clip are reproduced at the same time as described above. Therefore, as the result, the first clip is reproduced at the time "00:00:00:00" from the positions of the frame number "00:00:00:00" to the frame number "00:10:00:00". Accordingly, when it is the time "00:10:00:00", the second clip is in turn reproduced from the positions of the frame number "00:00:00:00" to the frame number "00:05:30:00". As described above, in the edit list shown in FIG. 8, it is shown that the first clip and the second clip are edited to sequentially reproduce.

In other words, the edit list shown in FIG. 8 shows that the first clip (Clip 1) is reproduced for 10 minutes and the second clip (Clip 2) is then reproduced for 5 minutes 30 seconds.

As described above, the XML descriptions of the edit list file describe editing information about nondestructive editing for the clip and the clip to be referenced. In other words, the video camera 21 (FIG. 2) can identify the clip to be referenced in the edit list based on the edit list file.

In addition, in FIG. 8, the exemplary UMID showing each data is described as above, but the data merely shows the description positions of the UMID in the edit list and other data, and the UMID is a virtual UMID with no meaningful values. In other words, the UMID described in FIG. 8 is the combination of meaningless symbols different from the actual UMID. In practice, the valid UMID created based on the method defined by SMPTE is described at each position instead of the virtual UMID.

Next, GUI (Graphical User Interface) screens which are used to make a request for acquiring the edited result by a user in the material using unit 29 will be described with reference to FIG. 9.

Figure 9:
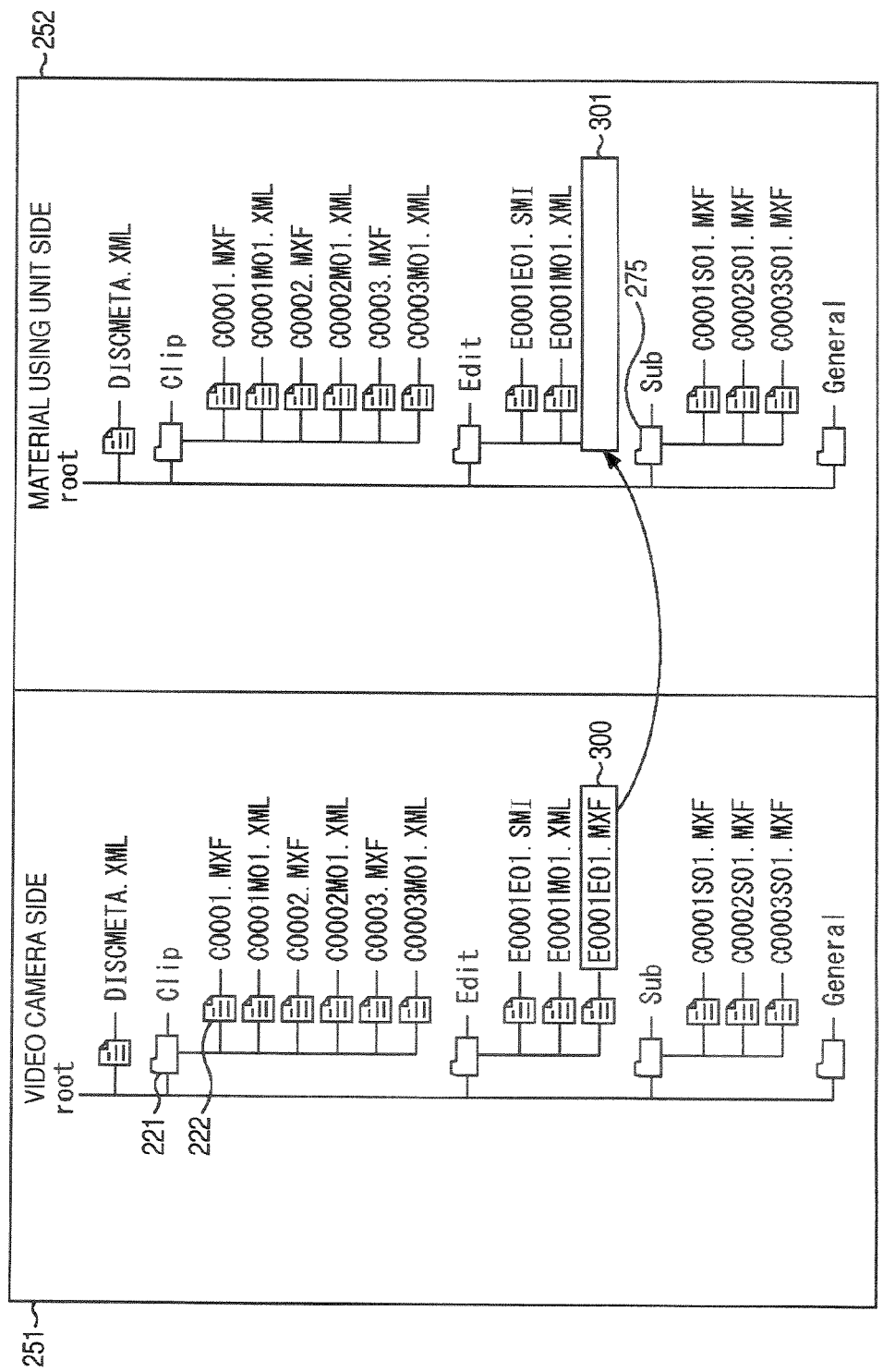
FIG. 9 shows a diagram illustrative of a GUI screen to make a request for the acquisition of an edited result by a user.

In addition, in FIG. 9, it is assumed that files having the directory structure shown in FIG. 6 and recorded on the removable medium 33 are copied in the recording part 208 of the material using unit 29.

As shown in FIG. 9, a user manipulates the input part 206 of the material using unit 29 (FIG. 5) to display a screen 251 which displays the directory structure of the files recorded on the removable medium 33 of the video camera 21, and a screen 252 which displays the directory structure of the files copied in the recording part 208 of the material using unit 29.

In FIG. 9, the screen 251 displays real files having the directory structure shown in FIG. 6 and recorded on the removable medium 33. In addition, at the lower level of the edit directory (Edit), a virtual file (E0001E01.MXF) is disposed which specifies the edited result corresponding to an edit list file (E0001E01.SMI). In the case in which the virtual file (E0001E01.MXF) is selected, the CPU 201 specifies as a process target the edited result that is reconfigured based on the edit list for the edit list file (E0001E01.SMI) among the files recorded on the removable medium 33 (for example, it is supposed that the edit list file E0001E01.SMI is the edit file shown in FIG. 8, the edited result is the combination of the first clip (C0001.MXF) from the time 00:00:00:00 to the time 00:10:00:00 with the second clip (C0002.MXF) from the time 00:00:00:00 to the time 00:05:30:00).

In addition, the screen 252 displays the directory structure shown in FIG. 6. In other words, since the real files recorded on the removable medium 33 are copied in the recording part 208 of the material using unit 29, the directory structure of the files recorded in the recording part 208 is the same as the directory structure shown in FIG. 6.

Here, on the screen 251, the user drags a position 300 (in the example shown in FIG. 9, the position at which characters "E0001E01.MXF" are displayed) that is associated with the virtual file (E0001E01.MXF) corresponding to a desired edit list, and drops it in an area 301 below an edit list metadata file (E0001M01.XML) on the screen 252. Thus, the user can make a request for acquiring the edited result of a first time editing process corresponding to the edit list file (E0001E01.MXF).

Next, an acquisition process in which the edited result is acquired by the material using unit 29 from the video camera 21 will be described with reference to FIG. 10.

At Step S51, the CPU 201 of the material using unit 29 controls the communicating part 209 in response to an instruction by a user supplied from the input part 206 and displayed on the screen 251 (FIG. 9), and makes a request to the video camera 21 for directory information showing the directory structure of the files recorded on the removable medium 33.

At Step S71, the microcomputer 134 of the video camera 21 receives the request for the directory information via the network I/F 136, the bus 137 and others, and the process goes to Step S72. At Step S72, the microcomputer 134 reads directory information about the files recorded on the removable medium 33 out of the medium via the recorder I/F 135, the communication block I/F 114 and others, and transmits the directory information to the material using unit 29 via the network I/F 136, the network 31, the intranet 32 and others.

After the process at Step S51, the process goes to Step S52. The CPU 201 of the material using unit 29 receives the directory information from the video camera 21 through the communicating part 209, and allows the output part 207 to display the screen 251 based on the directory information. After the process at Step S52, the process goes to Step S53. The CPU 201 reads directory information about the files recorded in the recording part 208, and allows the output part 207 to display the screen 252 (FIG. 9) based on the directory information.

Here, the user manipulates the input part 206 to drag the position 300 of the virtual file (E0001E01.MXF) corresponding to the edit list for a desired edited result displayed on the screen 251, and drops it in the area 301 on the screen 252, whereby the user instructs a request for acquiring the edited result corresponding to the virtual file (E0001E01.MXF).

At Step S54, in response to the instruction of the request for acquiring the edited result from the input part 206, the CPU 201 of the material using unit 29 makes a request to the video camera 21 for acquiring the edited result corresponding to the virtual file (E0001E01.MXF) via the communicating part 209 and others. In other words, the CPU 201 transmits data to request to acquire the edited result corresponding to the virtual file (E0001E01.MXF) to the video camera 21.

At Step S73, the microcomputer 134 of the video camera 21 receives the request for acquiring the edited result corresponding to the virtual file (E0001E01.MXF) via the network I/F 136 and others, and supplies the request to the microcomputer 106 via the recorder I/F 135, the communication block I/F 114 and others.

After the process at Step S73, the process goes to Step S74. The microcomputer 106 performs a creation process which creates the edited result corresponding to the virtual file (E0001E01.MXF) The detail of the creation process will be described with reference to FIG. 11 described later. After the process at Step S74, the process goes to Step S75. The microcomputer 134 transmits the edited result created at Step S74 to the material using unit 29 via the network I/F 136 and others.

After the process at Step S54, the process goes to Step S55. The CPU 201 of the material using unit 29 acquires the edited result from the material using unit 29 via the input part 206 and others, and records it in the edit directory (Edit) of the recording part 208. After that, the user manipulates the input part 206 to instruct the output part 207 to display the screen showing the directory structure of the files recorded in the recording part 208, and then the same screen as the screen 251 is displayed in the output part 207, that is, the screen is displayed which an edited result file (E0001E01.MXF) is newly added in the area 301 on the screen 252. In addition, the edited result file (E0001E01.MXF) is a real file.

In summary, the user of the material using unit 29 only drags the position 300 corresponding to the virtual file (E0001E01.MXF) in the area 301 to acquire the edited result.

Figure 11:
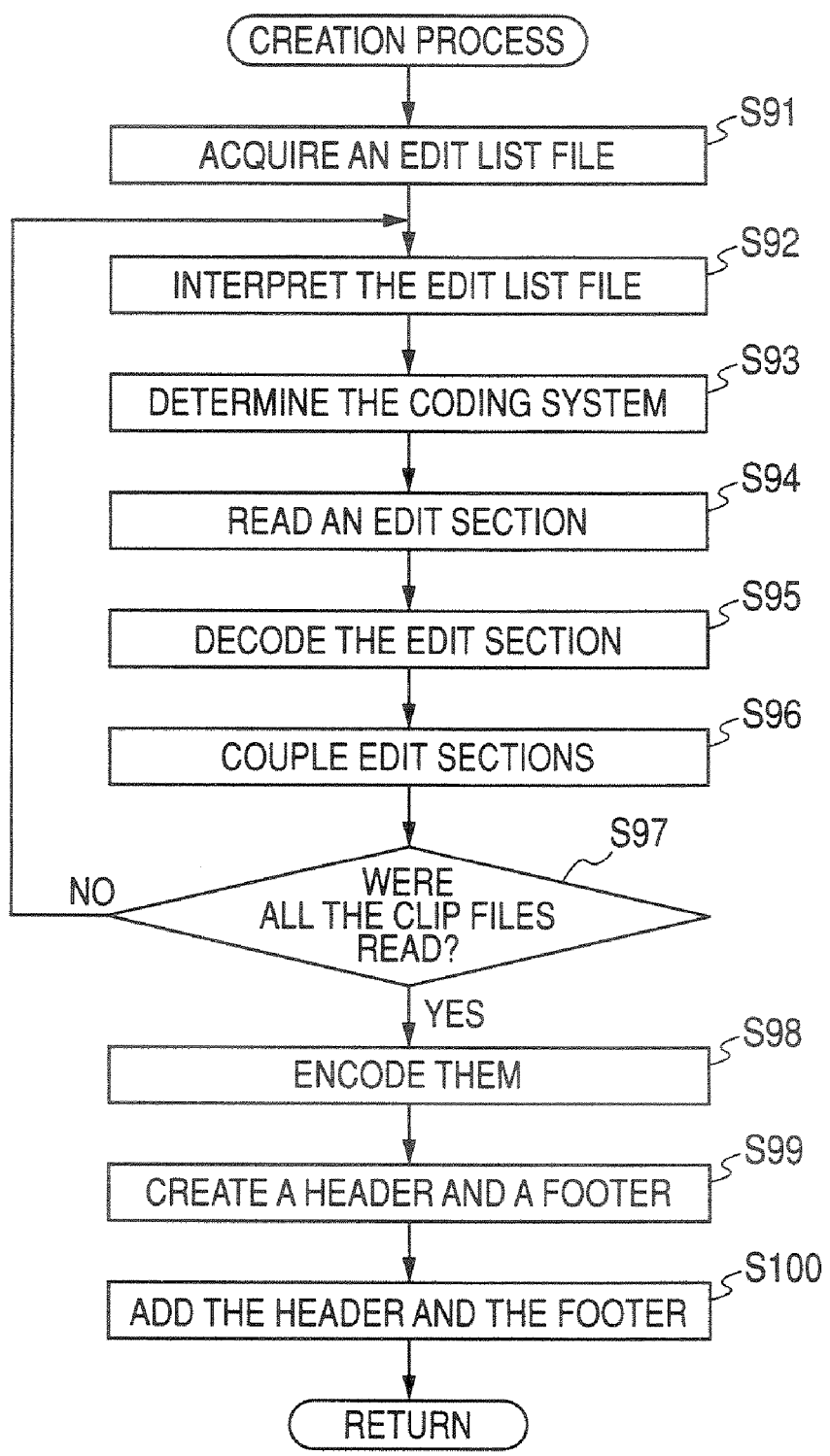
FIG. 11 shows a flow chart illustrative of a creation process at Step S74 shown in FIG. 10.

Next, the creation process at Step S74 shown in FIG. 10 will be described with reference to FIG. 11.

At Step S91, the acquiring part 172 acquires the edit list file (E0001E01.SMI) shown in FIG. 6 corresponding to the virtual file (E0001E01.MXF) from the removable medium 33, and supplies it to the reading part 173, and the process goes to Step S92.

At Step S92, the reading part 173 interprets the edit list described in the edit list file (E0001E01.SMI), reads the files (C0001 to C0003) of the clips referenced in the edit list, and supplies the files of the clips and the edit list to the splitting part 174.

After the process at Step S92, the process goes to Step S93. The splitting part 173 splits the files of the clips (C0001 to C0003) into a header, a footer and a body, determines an encoding system for the clip arranged in the body from the encoding system arranged in the header partition pack in the header, and supplies the encoding system to the decoder 175. In addition, the splitting part 173 supplies the header and the footer of the files of the clips to the adding part 179.

After the process at Step S93, the process goes to Step S94. The splitting part 173 interprets the edit list from the reading part 173, extracts the edit section (the clip configuring the edited result) in the clip arranged in the body of the files of the clips, and supplies it to the decoder 175.

For example, the splitting part 173 interprets the edit list shown in FIG. 8, extracts as the edit section the clip corresponding to the frame from the frame numbers "00:00:00:00" to "00:10:00:00" arranged in the body of the file having the UMID of the first clip "060A2B 340101010501010D1213000000FEDCBA9876543210FE DCBA9876543210", and supplies it to the decoder 175.

After the process at Step S94, the process goes to Step S95. The decoder 175 decodes the edit section supplied from the splitting part 173 in accordance with the system corresponding to the encoding system supplied at Step S93, and supplies it to the synthesizing part 176.

After the process at Step S95, the process goes to Step S96. The synthesizing part 176 couples (synthesizes) the edit section supplied from the decoder 175 to the edit section held at the preceding Step S96, and holds it. In addition, at Step S96 for the first time, the synthesizing part 176 holds the edit section supplied from the decoder 175 as it is.

After the process at Step S96, the process goes to Step S97. The reading part 173 determines whether all the files of the clips to be referenced in the edit list are read. When it determines that all the files of the clips are not read yet, the process returns to Step S92 to repeat the process steps described above.

On the other hand, at Step S97, the reading part 173 determines that all the files of the clips are read, the synthesizing part 176 supplies the edit section held therein to the encoder 178, and the process goes to Step S98.

At Step S98, the encoder 178 encodes the edit section from the synthesizing part 176 in accordance with the encoding system supplied from the selecting part 177 and specified by the user, and supplies it to the adding part 179.

After the process at Step S98, the process goes to Step S99. The adding part 179 creates a header and a footer based on the header and the footer supplied from the splitting part 174 and the encoding system supplied from the selecting part 177 and other data. For example, the adding part 179 computes the data length of the edit section arranged in the body, for example, and creates the header metadata of the header.

After the process at Step S99, the process goes to Step S100. The adding part 179 places the edit section from the synthesizing part 176 in the body, and adds the header and the footer created at Step S99 to the body to create the edited result. Then, after the process at Step S100, the process goes to Step S75 shown in FIG. 10.

As described above, in the network system 1, in order to process material data obtained in consequence of shooting, the edited result is created by the video camera 21 already provided with the functions of encoding and decoding (the video coding part 74, the audio coding part 101, the audio decoding part 105, the video decoding part 111, etc. shown in FIG. 3) for processing the material data obtained in consequence of shooting. Therefore, it is unnecessary for the material using unit 29 to have the functions of encoding and decoding, whereby the costs of the material using unit 29 can be curtailed.

In addition, in the discussion above, the material data of the edited result is transmitted from the video camera 21 to the material using unit 29. Not only the material data but also proxy image data corresponding to the material data may be transmitted. Also in this case, the material using unit 29 acquires the proxy image data corresponding to the edited result by the similar process steps as those in the acquisition process shown in FIG. 10.

In addition, when the video camera 21 transmits both of the material data of the edited result and the proxy image data, it transmits the proxy image data prior to the material data. Since the proxy image data has a smaller data volume than material data has, the material using unit 29 can receive proxy image data for a shorter time period than receiving material data. Accordingly, the user of the material using unit 29 can quickly receive proxy image data earlier than receiving material data, and can comprehend the overall edited result.

Next, communications between the video camera 21 and the material using unit 29 will be described with reference to FIGS. 12 to 14.

Figure 12:
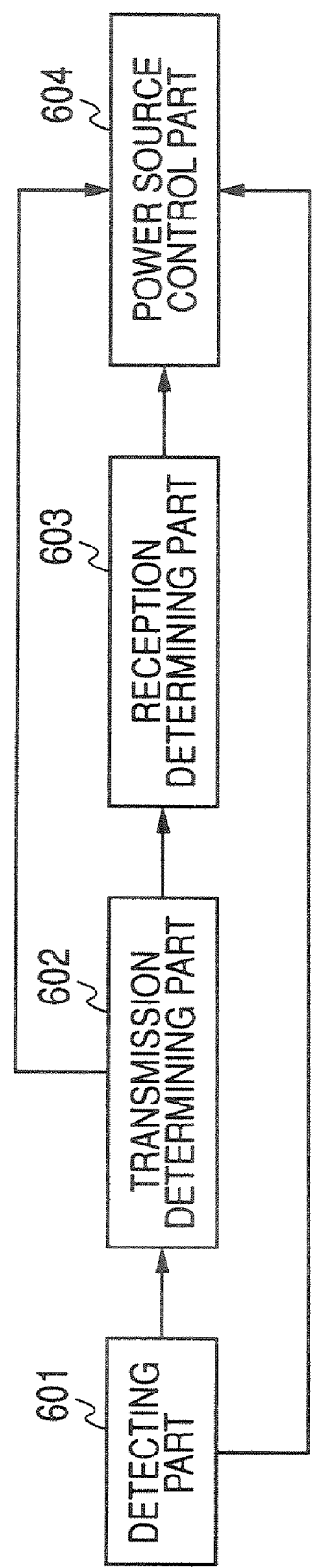
FIG. 12 shows a block diagram depicting an exemplary configuration of a function of power source control relating to communication of a communication block.

FIG. 12 shows a block diagram depicting an exemplary configuration of the functions in the video camera 21 conducting communications with the material using unit 29. In other words, FIG. 12 shows the configuration of all or a part of the functions of the receiving part 171 and the transmitting part 180 shown in FIG. 4.

The video camera 21 shown in FIG. 12 is configured of a detecting part 601, a transmission determining part 602, a reception determining part 603, and a power source control part 604. In addition, for example, the detecting part 601, the transmission determining part 602, the reception determining part 603, and the power source control part 604 correspond to the microcomputer 134 shown in FIG. 3.

The detecting part 601 detects the access point 23, and supplies the detected result to the transmission determining part 602. The transmission determining part 602 transmits data to be transmitted (for example, directory information, the edited result, etc.) to the material using unit 29 in response to the detected result from the detecting part 601. The transmission determining part 602 informs the power source control part 604 that there is data to be transmitted, and informs the reception determining part 603 that the transmission is finished or that there is no data to be transmitted.

The reception determining part 603 receives data transmitted from the material using unit 29 (for example, the request etc.) in response to the notification from the transmission determining part 602. The reception determining part 603 informs the power source control part 604 that there is data transmitted from the material using unit 29, and that transmission is finished, or that there is no data transmitted from the material using unit 29.

The power source control part 604 creates a power source control signal that controls the supply of power to the recorder block 52 in response to the detected result from the detecting part 601, or the notification from the transmission determining part 602 or the reception determining part 603, and supplies it to the power source block 54.

Next, a power source control process in which the video camera 21 controls the supply of power to the recorder block 52 will be described with reference to FIG. 13. For example, the power source control process is started when the power source of the video camera 21 is turned on, that is, when the power source is supplied to the power source part 151.

At Step S601, the detecting part 601 detects the access point 23 shown in FIG. 2, and supplies the detected result to the transmission determining part 602, and the process goes to Step S602. At Step S602, the detecting part 601 determines whether the access point 23 can be detected, and supplies the determined result to the transmission determining part 602. When the detecting part 601 determines that the access point 23 is unable to be detected at Step S601, it waits until the access point 23 can be detected.

On the other hand, when it determines that the access point 23 can be detected at Step S602, the process goes to Step S603. The transmission determining part 602 starts connection to the network 31 via the access point 23, and the process goes to Step S604.

At Step S604, the transmission determining part 602 makes a request to the material using unit 29 for starting communications, and the process goes to Step S605.

At Step S605, the transmission determining part 602 determines whether there is data to be transmitted. When it determines that there is data to be transmitted, the process goes to Step S606.

At Step S606, the power source control part 604 creates a power source control signal so as to turn on the power source of the recorder block 52, supplies it to the power source block 54, and then turns on the power source of the recorder block 52, and the process goes to Step S607. At Step S607, the transmission determining part 602 notifies the material using unit 29 that there is data to be transmitted, and the process goes to Step S608.

At Step S608, the transmission determining part 602 transmits data to be transmitted to the material using unit 29, and the process goes to Step S609. At Step S609, the transmission determining part 602 determines whether the transmission of data to be transmitted is all finished. When it determines that the transmission of data to be transmitted is not all finished, the process returns to Step S608 to repeat the process steps described above.

At Step S609, when it determines that the transmission of data to be transmitted is all finished, the process goes to Step S610. The reception determining part 603 determines whether there is data to be received, that is, whether there is data to be transmitted from the material using unit 29. At Step S610, when it is determined that there is no data to be received, the process goes to Step S611. The power source control part 604 creates a power source control signal so as to turn off the power source of the recorder block 52, supplies it to the power source block 54, and then turns off the power source of the recorder block 52, and the process is ended.

On the other hand, at Step S605, when it is determined that there is no data to be transmitted, the process goes to Step S612. The transmission determining part 602 notifies the material using unit 29 that there is no data to be transmitted, and the process goes to Step S613.

At Step S613, the reception determining part 603 determines whether there is data to be received, that is, whether there is data to be transmitted from the material using unit 29. When it determines that there is data to be received, the process goes to Step S614.

At Step S614, the power source control part 604 turns on the power source of the recorder block 52, and the process goes to Step S615. At Step S615, the reception determining part 603 receives data transmitted from the material using unit 29, and the process goes to Step S616.

At Step S616, the reception determining part 603 determines whether the reception of data transmitted from the material using unit 29 is all finished. When it determines that the reception of data is not all finished, the process returns to Step S615 to repeat the process steps described above.

On the other hand, at Step S616, when it is determined that the reception of data transmitted from the material using unit 29 is all finished, the process goes to Step S611. As described above, the power source control part 604 turns off the power source of the recorder block 52, and the process is ended.

In addition, at Step S610, when it is determined that there is data to be received, the process goes to Step S615 to perform the process steps described above.

Furthermore, at Step S613, when it is determined that there is no data to be received, Steps S614 to S616 are skipped, and the process goes to Step S611 to perform the process steps described above.

As described above, in the video camera 21, when the access point 23 is detected, the power source of the recorder block 52 is turned on while data is being transmitted or received.

In addition, in the video camera 21, when the access point 23 is not detected, that is, when it is difficult to do communications via the Internet 31, the power source of the recorder block 52 is turned off, in the block in which data of the clip to be the target for transmission and reception is reproduced or recorded, whereby power consumption by the video camera 21 can be reduced.

In addition, when the access point can be detected, the video camera 21 automatically starts connection to the network 31, whereby the user does not instruct starting connection to the network 31 to omit the user's efforts.

In addition, in the discussion above, the power source of the recorder block 52, that is, the power source supplied to all the components configuring the recorder block 52 is turned on, but the power source supplied to the components used for recording or reproduction in the recorder block 52 may only be turned on. In this case, when there is data to be transmitted, the power source supplied to the components used for reproduction is turned on, whereas when there is data to be received, the power source supplied to the components used for recording is turned on.

Next, a communication process in which the material using unit 29 communicates with the video camera 21 will be described with reference to FIG. 14.

Figure 13:
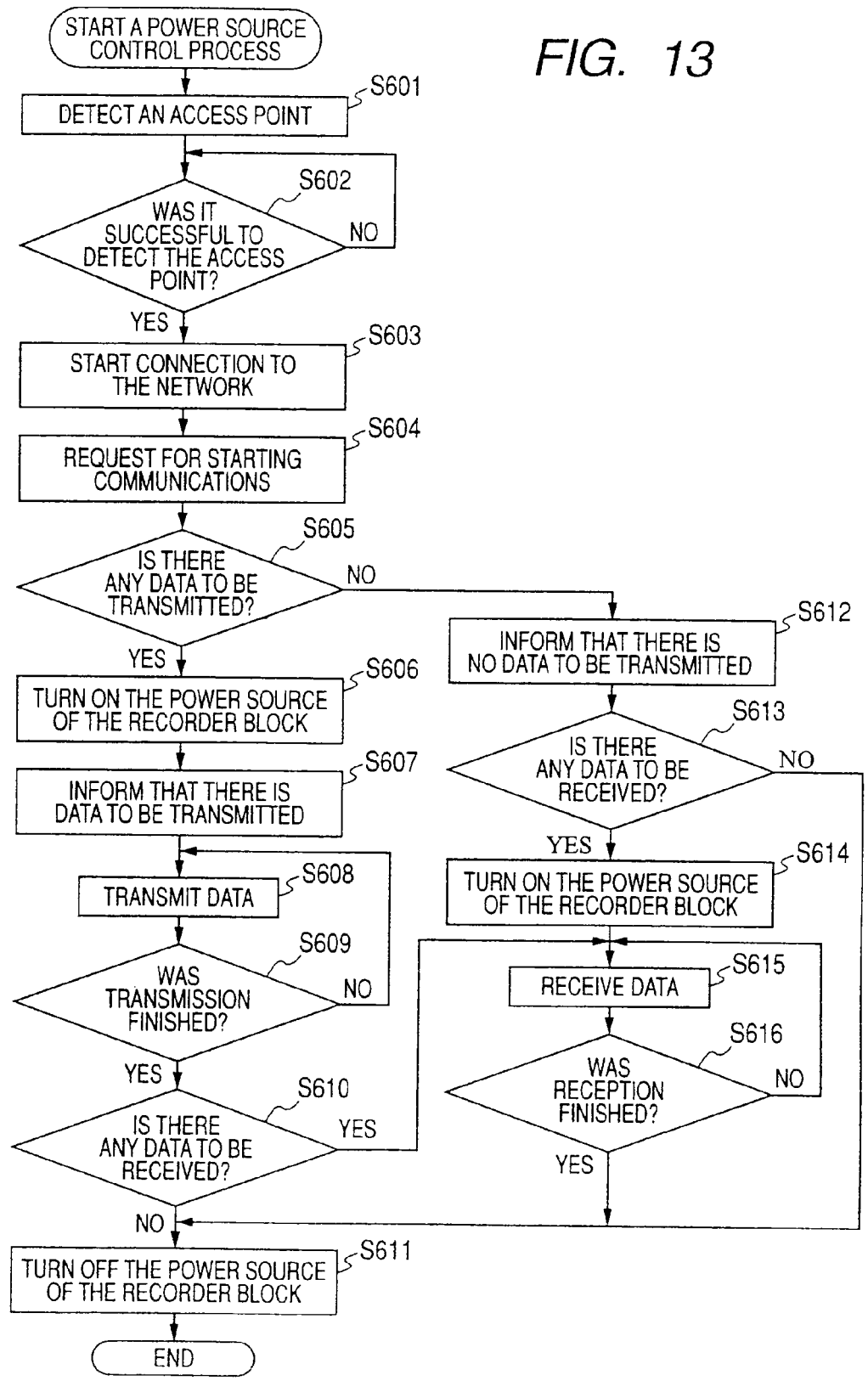
FIG. 13 shows a flow chart illustrative of a power source control process to control a power source relating to communication.

At Step S651, the CPU 201 determines whether the transmission determining part 602 is requested to start communications at Step S604 shown in FIG. 13. When it determines that no request is made for starting communications, it waits until a request is made for starting communications.

On the other hand, at Step S651, when it determines that a request is made for starting communications, the process goes to Step S652. The CPU 201 starts communications with the video camera 21, and the process goes to Step S653.

At Step S653, the CPU 201 determines whether there is data to be received, that is, whether the transmission determining part 602 informs that there is data to be transmitted at Step S607 shown in FIG. 13. At Step S653, when it is determined that there is data to be received, the process goes to Step S654. The CPU 201 receives data transmitted from the transmission determining part 602.

After the process at Step S654, the process goes to Step S655. The CPU 201 determines whether the reception of data transmitted from the transmission determining part 602 is all finished. When it determines that the reception is not finished, the process returns to Step S654 to repeat the process steps described above.

On the other hand, at Step S655, when it is determined that the reception is finished, the process goes to Step S656. The CPU 201 determines whether there is data to be transmitted to the video camera 21. When it determines that there is no data to be transmitted, the process goes to Step S657.

At Step S657, the CPU 201 informs the video camera 21 that there is no data to be transmitted, and the process is ended.

In addition, at Step S653, when it is determined that there is no data to be received, at Step S658, the CPU 201 determines whether there is data to be transmitted to the video camera 21 as similar to Step S656. When it determines that there is data to be transmitted, the process goes to Step S659.

At Step S659, the CPU 201 notifies the video camera 21 that there is data to be transmitted. As described above, when the video camera 21 is notified that there is data to be transmitted, at Step S610 or S613 shown in FIG. 13, it is determined that there is data to be received. After the process at Step S659, the process goes to Step S660. The CPU 201 transmits data to be transmitted to the video camera 21, and the process goes to Step S661. At Step S661, the CPU 201 determines whether the transmission of data to be transmitted is all finished. When it determines that the transmission is not finished, the process returns to Step S660 to repeat the process steps described above.

On the other hand, at Step S661, when it is determined that the transmission is finished, the process is ended. In addition, at Step S658, when it is determined that there is no data to be transmitted, the process goes to Step S662. The CPU 201 notifies that there is no data to be transmitted as similar to Step S657. As described above, at Step S657 or Step S662, when it is notified that there is no data to be transmitted, at Step S610 or S613 shown in FIG. 13, it is determined that there is no data to be received.

In addition, at Step S656, when it is determined that there is data to be transmitted, the process goes to Step S659 to perform the process steps described above.

Figure 14:
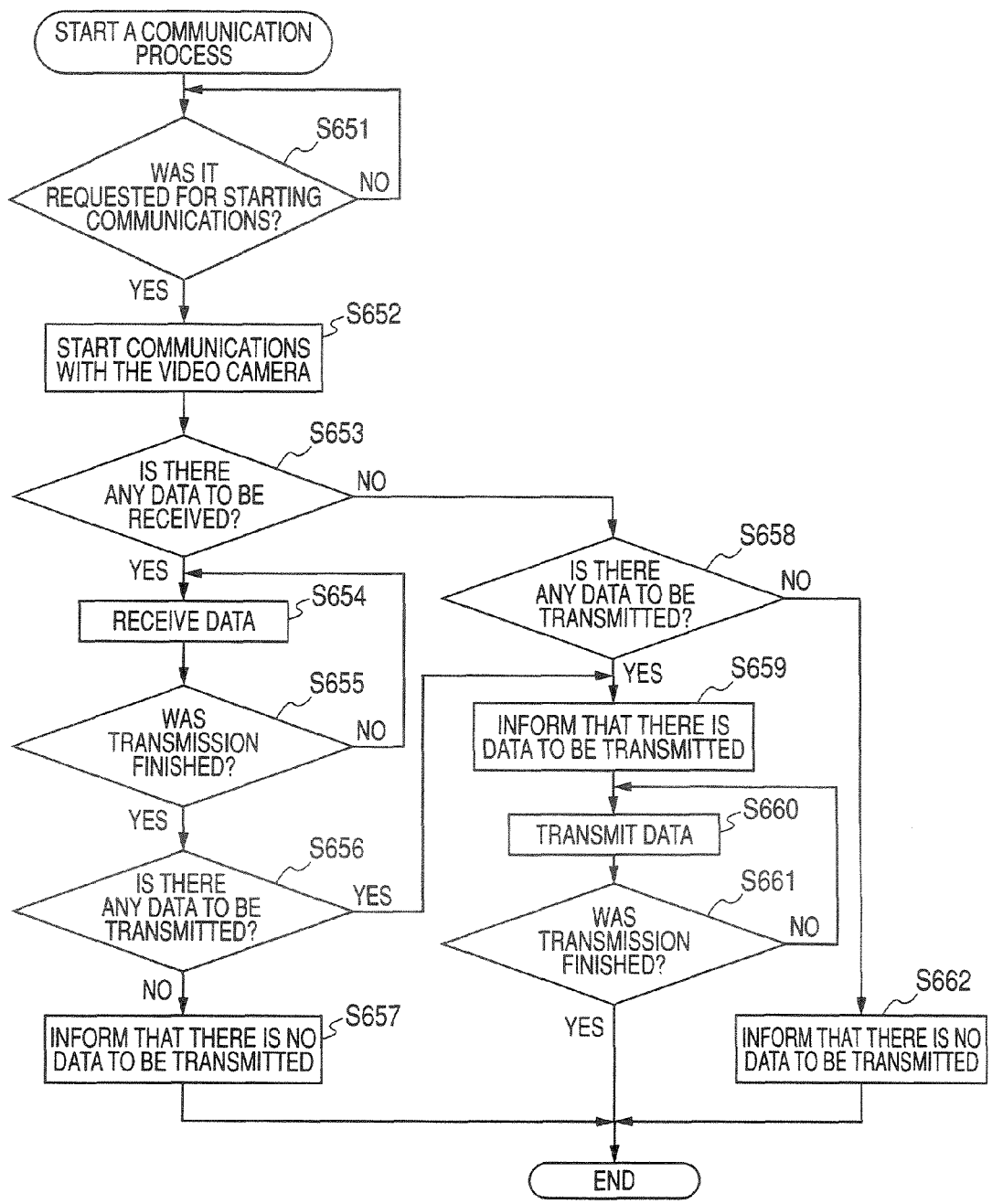
FIG. 14 shows a flow chart illustrative of a communication process to communicate with the video camera.

In addition, in the discussion in FIGS. 12 to 14 above, when the detecting part 601 detects the access point 23, the transmission determining part 602 automatically starts connection to the network 31. However, connection to the network 31 may be started manually. In other words, this scheme may be done in which when the access point 23 is detected, the video camera 21 notifies the user that the access point is detected through the LCD 112 shown in FIG. 3, for example, and connection to the network 31 is started at the time when the user received that notification starts connection to the network 31.

In addition, the user may select the start of automatic or manual connection to the network 31.

As described above, in the video camera 21, the reading part 173 reads the files of the clips (C0001 to C0003) referenced in the edit list based on the edit list, the adding part 179 creates a single file as the edited result from the read files of the clips, and the transmitting part 180 transmits the created edited result, whereby the costs on the acquisition side can be curtailed that acquire the edited result of data in a plurality of files as a single file.

In addition, in the specification, steps describing the program stored in the program recording medium of course include process steps done in time series along the described order as well as process steps done in parallel or separately not necessarily done in time series.

In addition, in the specification, the system describes the overall apparatus configured of a plurality of devices.

In addition, an embodiment of the invention is not limited to the above embodiments, which can be modified in the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitter-receiver system, comprising:
a transmitting apparatus configured to transmit an edited result obtained in consequence of editing material data in a plurality of files, and including:
  a recorder configured to acquire the material data stored in the plurality of files;
  a storage unit configured to store the plurality of the files and editing information, the editing information including an edit list designating a plurality of the files to be included in the edited result and including information designating at least a portion of the respective files to be included in the edited result;
  an acquiring unit configured to acquire the editing information from the storage unit;
  a read unit configured to read the material data acquired by the recorder and stored in the files designated by the edit list of the editing information acquired by the acquiring unit;
  a creating unit configured to create a single file as the edited result from the material data read by the read unit, the creating unit including:
    a decoder configured to decode the material data read by the read unit;
    a joining unit configured to join at least portions of a plurality of items of the material data decoded by the decoder designated by the edit list of the editing information to create a single result; and
    an encoder configured to encode the single result joined by the joining unit to create the single file as the edited result; and
  a transmitting unit configured to transmit the edited result created by the creating unit to a receiving apparatus, wherein
the receiving apparatus is configured to receive the edited result transmitted from the transmitting apparatus, and includes:

a receiving unit configured to receive the edited result transmitted from the edited result transmitting unit.

2. The information processing apparatus of claim 1, wherein the storage unit includes a virtual file corresponding to the edited result.

3. The information processing apparatus of claim 1, wherein the creating unit creates the single file as the edited result in response to a request for the virtual file.

4. An information processing apparatus, comprising:
a recorder configured to acquire material data stored in a plurality of files;
a storage unit configured to store the plurality of files and editing information, the editing information including an edit list designating a plurality of the files to be included in an edited result and including information designating at least a portion of the respective files to be included in the edited result;
an acquiring unit configured to acquire the editing information from the storage unit;
a read unit configured to read the material data acquired by the recorder and stored in the files designated by the edit list of the editing information acquired by the acquiring unit;
a creating unit configured to create a single file as an edited result from the material data read by the read unit, the creating unit including:
a decoder configured to decode the material data read by the read unit;
a joining unit configured to join at least portions of a plurality of items of the material data decoded by the decoder designated by the edit list of the editing information to create a single result; and
an encoder configured to encode the single result joined by the joining unit to create the single file as the edited result; and
a transmitting unit configured to transmit the edited result created by the creating unit.

5. The information processing apparatus according to claim 4, wherein the creating unit further comprises:
an adding unit configured to arrange the edited result encoded by the encoder in a body and to add a header and a footer to the body as the edited result.

6. The information processing apparatus according to claim 5, wherein the footer includes a footer partition pack.

7. The information processing apparatus according to claim 4, wherein the acquiring unit is configured to acquire the editing information from the storage unit in response to a request from another information processing apparatus, and
the transmitting unit is configured to transmit the edited result corresponding to the request to the another information processing apparatus.

8. The information processing apparatus of claim 4, further comprising:
a transmitter;
a receiver;
a power source configured to selectively supply power to the encoder, the decoder, and the joining unit; and
a power source control apparatus configured to detect an access point, determine if any data is to be transmitted or received through the access point, and control the power source to supply power to the encoder, the decoder, and the joining unit if any data is to be transmitted or received.

9. An information processing method of an information processing apparatus having a storage unit configured to store a plurality of files and editing information, the information processing method comprising:
recording material data stored in the plurality of files;
acquiring the editing information from the storage unit, the editing information including an edit list designating a plurality of the files to be included in the edited result and including information designating at least a portion of the respective files to be included in the edited result;
reading the material data in the plurality of files designated by the edit list of the acquired editing information;
decoding the material data read in the plurality of files;
creating a single file as an edited result from the read material data by joining at least portions of a plurality of items of the material data designated by the edit list of the acquired editing information;
encoding the single file; and
transmitting the created and encoded edited result.

10. A non-transitory computer readable storage medium encoded thereon with a program, which when executed by a computer, allows the computer to control an information processing apparatus having a storage unit configured to store a plurality of files and editing information, the program comprising the steps of:
recording material data stored in the plurality of files;
acquiring the editing information from the storage unit, the editing information including an edit list designating a plurality of the files to be included in the edited result and including information designating at least a portion of the respective files to be included in the edited result;
reading the material data in the plurality of files designated by the edit list of the acquired editing information;
decoding the material data read in the plurality of files;
creating a single file as an edited result from the read material data by joining at least portions of a plurality of items of the material data designated by the edit list of the acquired editing information;
encoding the single file; and
transmitting the created and encoded edited result.

* * * * *